US006714987B1

(12) United States Patent
Amin et al.

(10) Patent No.: US 6,714,987 B1
(45) Date of Patent: Mar. 30, 2004

(54) ARCHITECTURE FOR AN IP CENTRIC DISTRIBUTED NETWORK

(75) Inventors: Rajesh B. Amin, Desoto, TX (US); Donald V. Hanley, McKinney, TX (US); Glenn C. Morrow, Plano, TX (US); John Allahyari, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/434,628

(22) Filed: Nov. 5, 1999

(51) Int. Cl.[7] .............................................. G06F 15/16
(52) U.S. Cl. ...................... 709/249; 709/200; 709/220; 709/223; 709/227
(58) Field of Search ................................ 709/200, 249, 709/227, 220, 223–229

(56) References Cited

U.S. PATENT DOCUMENTS

| | | | | |
|---|---|---|---|---|
| 5,642,515 A | * | 6/1997 | Jones et al. .................. 710/220 |
| 5,701,120 A | * | 12/1997 | Perelman et al. ....... 340/825.02 |
| 5,909,550 A | * | 6/1999 | Shankar et al. .............. 709/227 |
| 6,266,782 B1 | * | 7/2001 | Carter et al. ..................... 714/4 |
| 6,286,052 B1 | * | 9/2001 | McCloghrie et al. ........ 709/238 |
| 6,421,714 B1 | * | 7/2002 | Rai et al. ..................... 709/217 |

FOREIGN PATENT DOCUMENTS

| | | |
|---|---|---|
| EP | 0903905 | 3/1999 |
| EP | 0910198 | 4/1999 |
| WO | WO 99 48310 | 9/1999 |

* cited by examiner

*Primary Examiner*—Ario Etienne
*Assistant Examiner*—LaShonda Jacobs
(74) *Attorney, Agent, or Firm*—Haynes and Boone, LLP

(57) ABSTRACT

A method and system to for a communications network architecture for an Internet Protocol centric wireless network for a first user to communicate to a destination, the architecture comprising: a network service function layer within the wireless network. The network service function layer can include: a policy management server; an authorization server; a service accounting server; an authentication, authorization and accounting server; an unified directory within a directory server; a security gateway; and a mobility manager. The architecture also includes a local service function layer associated with the network service function layer. The local service function layer can include: an access accounting server; an authentication, authorization and accounting server; a security gateway; a policy enforcement server; a mobility manager; a network management server; and a wireless gateway. The architecture also includes an access management layer associated with the local service function layer. The access management layer can include: a location tracking server; a connection management server; a protocol server; an access management server; a policy enforcement server; a network management server; and a resource management server. The architecture also includes an access interface layer associated with the access management layer. The access interface layer can include: a channel management server; a policy enforcement server; an administration and maintenance server; and a radio frequency server.

47 Claims, 17 Drawing Sheets

ARCHITECTURE FOR AN IP CENTRIC DISTRIBUTED NETWORK

FIELD OF THE INVENTION

The invention relates generally to computers and, more particularly, to an architecture for an Internet Protocol centric distributed network and a method and apparatus for such a network.

BACKGROUND OF THE INVENTION

Recently, wireless communication devices have become more and more popular as a method of communicating from one point to another. Cellular Radio is one, and probably the most popular, method of wireless communication. The original and still, most common Cellular Mobile Telephone System is a low-powered, duplex, radio/telephone which operates between 800 and 900 mHz for TDMA and 1800 and 1900 mHz for CDMA, using multiple transceiver sites linked up to a central computer for coordination. The geographic region served by a cellular system is subdivided into areas called cells. Each cell has a central base station and two sets of assigned transmission frequencies; one set is used by the base station, and the other by mobile telephones. To prevent radio interference, each cell uses frequencies different from those used by its surrounding cells, but cells sufficiently distant from each other can use the same frequencies. When a mobile telephone leaves one cell and enters another, the telephone call is transferred from one base station and set of transmission frequencies to the next using a computerized switching system. The first cellular telephone system began operation in Tokyo in 1979, and the first U.S. system began operation in 1983 in Chicago.

The earlier system have been focused on providing mostly voice services with some capability of providing data communications as well. However, recently, the need for a network designed with other services in mind other than just voice has arisen. The network should be able to provide access to different application layer protocols such as Session Initiation Protocol, H.323, and Internet Protocol to name a few.

SUMMARY OF THE INVENTION

In contrast to the prior art, the present invention provides a distributed IP centric system and method for wireless access to an internet protocol (IP) based network, wherein the system and method is independent from technology used in accessing the network. The system also uses the application layer to send messages between the access layer and the IP network. The access layer also includes distributed IP based functionality and the flexibility to be incorporated into distributed servers on a Local Area Network (LAN). The access layer also includes the capability to support establishing and maintaining the wireless link and mobility services to the mobile station through the access layers along with simultaneous IP access to public domain services. The access layer also handles connection management independent from the hardware used (such as ATM, Ethernet, etc.).

To this end, in one embodiment the method and system include a communications network architecture for an Internet Protocol centric wireless network for a first user to communicate to a destination, the architecture comprising: a network service function layer within the wireless network. The network service function layer can include: a policy management server; an authorization server; a service accounting server; an authentication, authorization and accounting server; an unified directory within a directory server; a security gateway; and a mobility manager. The architecture also includes a local service function layer associated with the network service function layer. The local service function layer can include: an access accounting server; an authentication, authorization and accounting server; a security gateway; a policy enforcement server; a mobility manager; a network management server; and a wireless access gateway. The architecture also includes an access management layer associated with the local service function layer. The access management layer can include: a location tracking server; a connection management server; a protocol server; an access management server; a policy enforcement server; a network management server; and a resource management server. The architecture also includes an access interface layer associated with the access management layer. The access interface layer can include: a channel management server; a policy enforcement server; an administration and maintenance server; and a radio frequency server.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
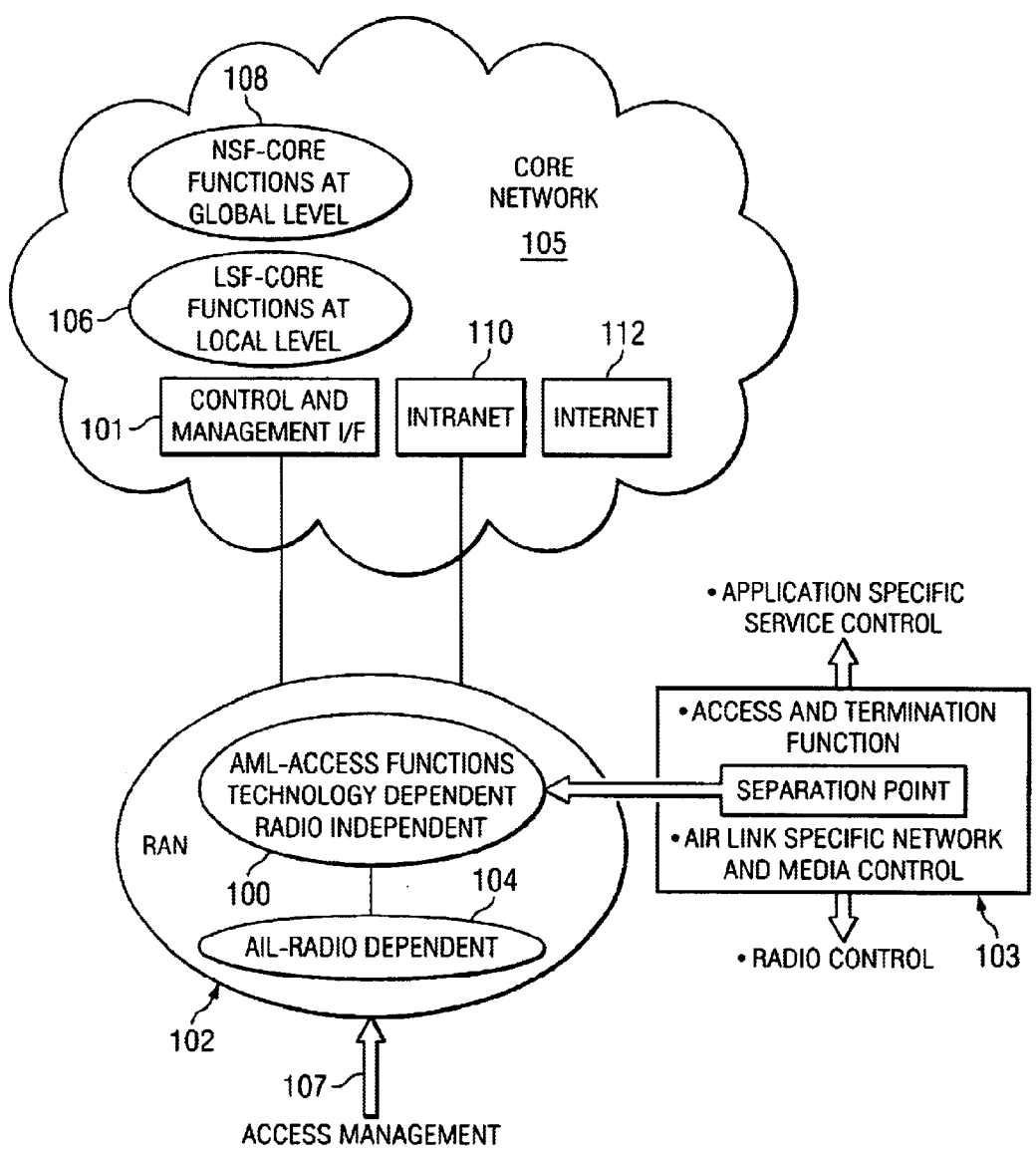
FIG. 1 is a diagram of separating wireless access from the Core Network.

The present invention can be described with several examples given below. It is understood, however, that the examples below are not necessarily limitations to the present invention, but are used to describe typical embodiments of operation. Additionally, a list of abbreviations and a glossary will be listed first to facilitate a better understanding of the invention.

| | |
|---|---|
| AAA | Authorization Authentication Accounting |
| AIL | Access Interface Layer |
| AML | Access Management Layer |
| ATM | Asynchronous Transfer Mode |
| CDMA | Code Division Multiplex Access |
| CN | Core Network |
| COA | Care Of Address |
| COPS | Common Open policy Service |
| dB | data Base |
| DHCP | Dynamic Host Configuration Protocol |
| DNS | Directory Name System |
| DEN | Directory Enabled Networking |
| DS | Directory Server |
| FR | Frame Relay |
| HDLC | High Level Data Link Control |
| IP | Internet Protocol |
| ITU | International Telecommunication Union |
| LAN | Local Area Network |
| LDAP | Lightweight Directory Access Protocol |
| LDP | Local Decision Point |
| LSF | Local Serving Function |
| L1 | Layer 1 |
| L2 | Layer 2 |
| L3 | Layer 3 |
| MH | Mobile Host |
| MM | Mobility Manager |
| MPLS | Multi-protocol Label Switching |
| MS | Mobile Station |
| NGWN | Next Generation Wireless Network |
| NSF | Network Serving Function |
| OSI | Open System Interconnection |
| PDP | Policy Decision Point |
| PPP | Point to Point Protocol |
| PSTN | Public Switched Telephone Network |
| RADIUS | Remote Authentication Dial-In User Service |
| RAN | Radio Access Network |
| RF | Radio Frequency |
| RSVP | Resource Reservation Protocol |
| RTCP | Real Time Control Protocol |
| RTP | Real Time Protocol |
| QoS | Quality of Service |
| SDP | Session Description Protocol |
| SIP | Session Initiation Protocol |
| SMS | Short Message Service |
| SS | Session Server |
| TCP | Transmission Control Protocol |
| UAC | User Agent Client |
| UAS | User Agent Server |
| UDP | User Datagram Protocol |
| UMTS | Universal Mobile Telecommunication System |
| UWN | Unified Wireless Network |
| WAG | Wireless Access Gateway |

Definition of Terms

UWN: The Unified Wireless Networks is the IP centric core-network consisting of LSF and NSF network components. The UWN is assumed to be independent of air interface technology. The interfaces between system components of the UWN are based on the LAN/WAN technology and uses client server architecture.

2G: The current wireless network components are referred to as the second-generation components. The 2G-network component uses industry-defined protocols and interfaces to communicate between the system and network components.

3G: The future wireless network components evolved from the 2G components are referred to as the third generation components. In the description of the preferred embodiment it is assumed that the 3G will be backward compatible to the 2G. For an example, 3G mobile (voice mode) terminal is capable to act as 2G mobile (voice mode) in voice call support. In addition, 3G will be able to support new standards for making a multi-media call using newly defined standards. The gateway devices may be used to support 2G and 3G components.

NG: The future wireless network components that evolve from the 3G components are referred to as the Next Generation components. The NG components are assumed to take full advantage of the IP centric network infrastructure and eliminate the need of gateway devices. End devices will become smarter with the capability of communicating without the need for the gateway or mapping functions.

NSF: The NSF is one of the network components of the UWN architecture. It consists of several system components. These components may include legacy components through the necessary interfaces or their functional equivalent suitable to the IP centric environment. Some of these components are HLR, SCP, Unified Directory, AAA server, SN, IP Service Platform (provides value added applications to the client), etc. Network Serving Function (NSF) is the global home component of the UWN that owns the mobile user's subscription.

LSF: The LSF is one of the network components of the UWN architecture. It consists of several system components. Some of these components are CS, MM, CD, DHCP, DNS, Gateway devices, etc. The Local Serving function (LSF) is the serving component of the UWN that provides services to local and visiting wireless subscriber in that area.

RAN: The Radio Access Network is the system component of the wireless network that provides radio control functions used in transmitting and receiving control and data information between mobiles and core network. The RAN itself is air technology dependent. However, it is evolving to provide independent functionality towards the IP centric core network. On this basis, RAN is assumed to have distinct radio interface and access management components. The radio management components provides the radio independent functionality towards the IP centric core network.

AML: The Access Management Layer is the service layer of the RAN that consists of radio management and access management components.

AIL: The Access Interface Layer is the service layer of the RAN that consists of air link interface handling components.

WAG: The Wireless Access Gateway is the entity that interfaces with the wireless access network such as 3G RAN and provides controlling capabilities to facilitate the RAN resources to meet users' requirements such as bandwidth management and also to interface with the intranet or Internet components.

WGW: The Wireless GateWay is the entity that interfaces and provides gateway functionality between the traditional wireless access such as BSC and the IP centric network. The WGW is assumed to provide merely tunneling capabilities to transport messages such as DTAP or BSMAP between IP centric network and the traditional 2G-access controller. This definition is not used in the description of the preferred embodiment. However, it is provided just to differentiate the meaning of WGW with the WAG described earlier.

UAC: User Agent Client is the first entity within the wireless network that assumes responsibility on behalf of the user to communicate with the core network or external network components. The UAC facilitates the activities in the ingress direction. Typically, the UAC is capable of communicating to the external servers directly. However, in some instances the UAC may convey such need to the UAC proxy.

UAS: User Agent Server is the entity that receives requests from the UAC or the UAC proxy. It facilitates the activity in the egress direction.

UAC proxy: User Agent Client Proxy takes responsibilities on behalf of the UACs to send appropriate requests to the server.

UAS proxy: User Agent Server proxy is the first entity within the wireless network that assumes the terminating responsibility on behalf of the receiving user. However, it has the ability to forward or redirect the call/session to other external components. The UAS-proxy facilitates the activities in the egress direction. Typically, the UAS proxy is capable of communicating to the terminating user directly. However, in most instances the UAS-proxy just conveys such information to the UAS that in turn communicates to the end user.

Ingress: This term is used for those activities that occur in direction from the mobile host to the network.

Egress: This term is used for those activities that occur in direction from the network to the mobile host.

Outgoing call/session: This term is used as defined by the bellcore documents. This term is used for the call/session activities that originated from the mobile host and progresses to other network through the serving network.

Incoming call/session: This term is used as defined by the Bellcore documents. This term is used for the call/session activity that originates from the external network and progresses to the mobile host through the serving network.

Introduction

The distributed IP centric Wireless Internet—NGWN architecture is centered around IP mobility management, call/session management, and network management. The scope of the description of the preferred embodiment is to explore call/session management services.

The call/session management services consist of three functions. These functions are: 1) establishing an access session between the mobile host and the serving network; 2) an invocation of a service session by the end user; and 3) facilitating network resources to establish point to point or point to multi-point virtual connection.

The establishment of an access session attaches the mobile host to the serving network. During the establishment, subscribers' are authenticated and granted either a specifically requested, or a default, bandwidth with the desired quality of service. Once the access session is established, the mobile host becomes IP capable and can reach, or be reached, any other devices. The access session remains active while the mobile host is attached to the serving network.

Once the access session is established, the user can invoke a service session. The user is provided with user capabilities and network preferences to use services from the serving network or externally accessed services. Although the user is provided with many choices of service invocation, the one of the main components is call/session control services. The management of call/session control is distributed to a set of appropriate servers (functions) within the access management and Local Service Function (LSF) network service layers. This distribution allows access relevant activities to be coupled with the access dependent service layers, and policy decision making activities coupled with the access independent layers. The services originated at the application level are configured with the appropriate application servers at the LSF service layer. In addition, call/session control services are part of the access management services that aids to facilitate in establishing point to point and point to multi-point virtual connections.

The main components of the Unified Wireless Networks (AWN) consist of IP mobility management components, call/session management components, network management control, and gateway devices that interface with other systems supporting different protocols. The network management control functionality is also important but dependent on the full definition on the other components. The gateway functionality is also required along with the other appropriate components of the UWN.

The description of the preferred embodiment focuses on the functional components of the call/session management services. These functional components are distributed in distinct network service layers based on their role. The network access and user service related functional components are distributed in the access management and service management layers respectively. Further; the service management layer is distributed into a local network service layer and a global network service layer.

Thus, realization of functional components and their appropriate separation into access and service layers have allowed separating network, access and service management functions from the media transport. This enabled the end user to have choice of using serving network services or to use external Internet services. Detailed procedures to establish the access session and invoke the service session are discussed below.

Objectives/Requirements

The call/session management tasks are expected to achieve objectives for three basic functions. These functions are comprised of first, establishing, maintaining and terminating an access session between mobile host and the serving network. Second, providing network services to the mobile host that allows a mobile host to establish a service session. And third, facilitating transport resources of the serving network to establish a transport session based on the mobile hosts' need of bandwidth with a desired quality of service. The desired objectives to achieve these three functions are described below. Moreover, the call/session management functions are real time sensitive where access of decision making information and propagation delay through the network infrastructure plays an important and critical role. Additional objectives related to performance, capacity, and scalability are also identified for real time and other similar issues.

Access, Service, and Transport Session Objectives

These three basic functions of the call/session management services are identified and elaborated to distinctly depict the differences within the Wireless Internet.

Access Related Objectives

An establishment of an access session enables the mobile host to establish a point of presence at the local serving network. During access session establishment, subscriber management services are executed. These services include admission policy control decision, provisioning of default air link resources, and establishing the virtual packet channel that allows mobile hosts to interface with the external Internet network. The following paragraphs describe the access related objectives in detail.

Any access dependent requirements for subscriber management services should be identified. The subscriber management services include authentication, authorization, usage selection and usage constraints associated with subscriber.

User authentication and authorization are based on digital certificates/signatures, and is provided by an authentication server.

Usage selection and user constraints are based on the subscriber profile and network policy.

Provisioning the local serving functions with access and usage profile in order to provide allowed access and usage services to the mobile host.

Handling of flexible bandwidth provisioning and supporting requirements.

Handling of accounting requirements based on flat rate, per packet, time used, and/or Quality of Service provided.

Handling of data speed requirements of up to 144 kb/s for vehicular users, up to 384 kb/s for outdoor to indoor mobility, and up to 2 Mb/s for indoor and Pico cell environments.

Handling of Quality of Service requirements.

Service Session Related Objectives

The service session enables an end user to use services provided by the serving network. Also, an end user can use the serving network services to dynamically change network transport resources. That will allow an end user to access globally available network services at the required bandwidth for a desired quality of service. The following paragraphs describe a few objectives.

Identify serving network services to facilitate use of access network application servers to provide services independent from the subscriber's home network.

Identify any interaction needed in providing global network services that are based on service level agreements between other networks (home or third party).

Identify serving networks' role in enabling end user to form a private network within the scope of serving the Wireless Internet.

Identify scheme for reporting network resource usage.

Establishing and managing voice, paging, Short Message Service (SMS), and circuit and packet data oriented services (e.g. multi-media conference, on-line subscription, etc.).

Service capabilities related to information and functionality such as dynamic negotiation of QoS, use of Intranet service and use of communication resources.

Transport Related Objectives

The transport session activities enable the mobile host to use the network's air and virtual packet channel path resources. The following paragraphs describe a few identified objectives.

Establishing bearer connection path for an air link and virtual packet channel using serving network's resources.

Facilitating Point to Point, Point to Multi-point and Multi-point to multi-point connection.

Facilitating use of underlying network infrastructure resources such as ATM, FR, or Ethernet.

Facilitating use of payload coding/decoding task identified by the payload mediation function of the local serving function.

Other Related Objectives

The following paragraphs describe a few more important objectives.

Performance objectives:

Minimum packet delay; ITU recommends roundtrip delay less than 300 ms.

Minimum packet loss, such that no noticeable degrade in voice quality and the performance of fax.

Maximum throughput via a virtual connection

Optimized bandwidth distribution

Challenges

An identification of the Call/Session management functions and objectives for the newly defined NGWN are relatively straightforward. However, the feasibility of such objectives to implement and achieve quality of traditional networks in the newly defined Wireless Internet is not an easy task;. it is a paradigm shift. It involves many unknowns and challenges. An attempt is made here to list such challenges in this section along with the solutions in subsequent sections.

Identify interfaces and signaling objectives between mobile host and network components. More precisely between:

Mobile host and network's access management layer (AML) functional components to establish access session.

Mobile host and network's local service layer functional (LSF) components to establish service session.

Mobile host and home network service layer functional components (NSF) to establish Virtual Home Environment.

Achieve distributed transparencies for applications.

Achieve optimized information caching significant to established clusters and domains.

Reduce dependencies for availability and reliability of network components due to network problems, server problems and faulty software.

Achieve scheme to reach neighboring domains directly avoiding hierarchical intervention.

Identify both connection oriented and transaction-oriented services.

Identify inter-working between non-IP access network and IP-based core network.

Architectural Framework: Emphasizing Call/Session Management Components

This section establishes context for the call/session management services. An architectural framework is illustrated mainly emphasizing the functional service layers and components. It starts with separation of functional boundaries and later decomposes functional components in detail. The interfaces and interactions between network entities and inter-working between functional service layer components is described below. However, in order to illustrate the separation of functional layers and the respective inter-working between layers, the description will not flow from FIG. 1 through FIG. 8 sequentially, but will refer to the figures out of order. However, the elements are numbered consistently throughout FIGS. 1 through 8 so as to help the understanding of the description.

Architectural Overview

The NGWN/Wireless Internet is an IP centric distributed Local Area Network (LAN) based architecture. The network components in this architecture are functionally separated as required to fulfill the need of wireless telecommunication and is also suitable to integrate with other data and telecommunication networks.

Figure 2:
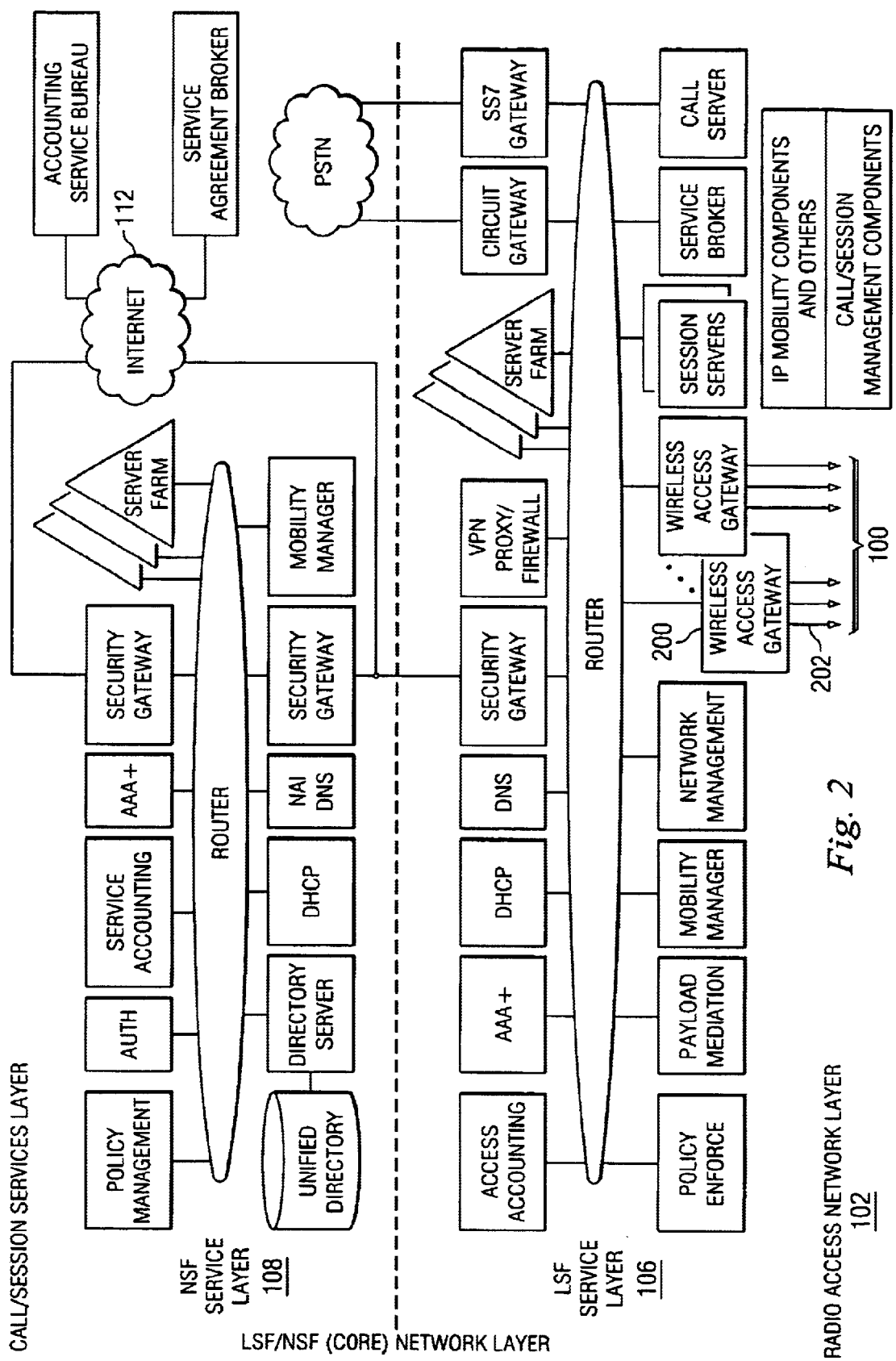
FIG. 2 is a diagram of the LSF/NSF (core) Layer functional service components.
Figure 3:
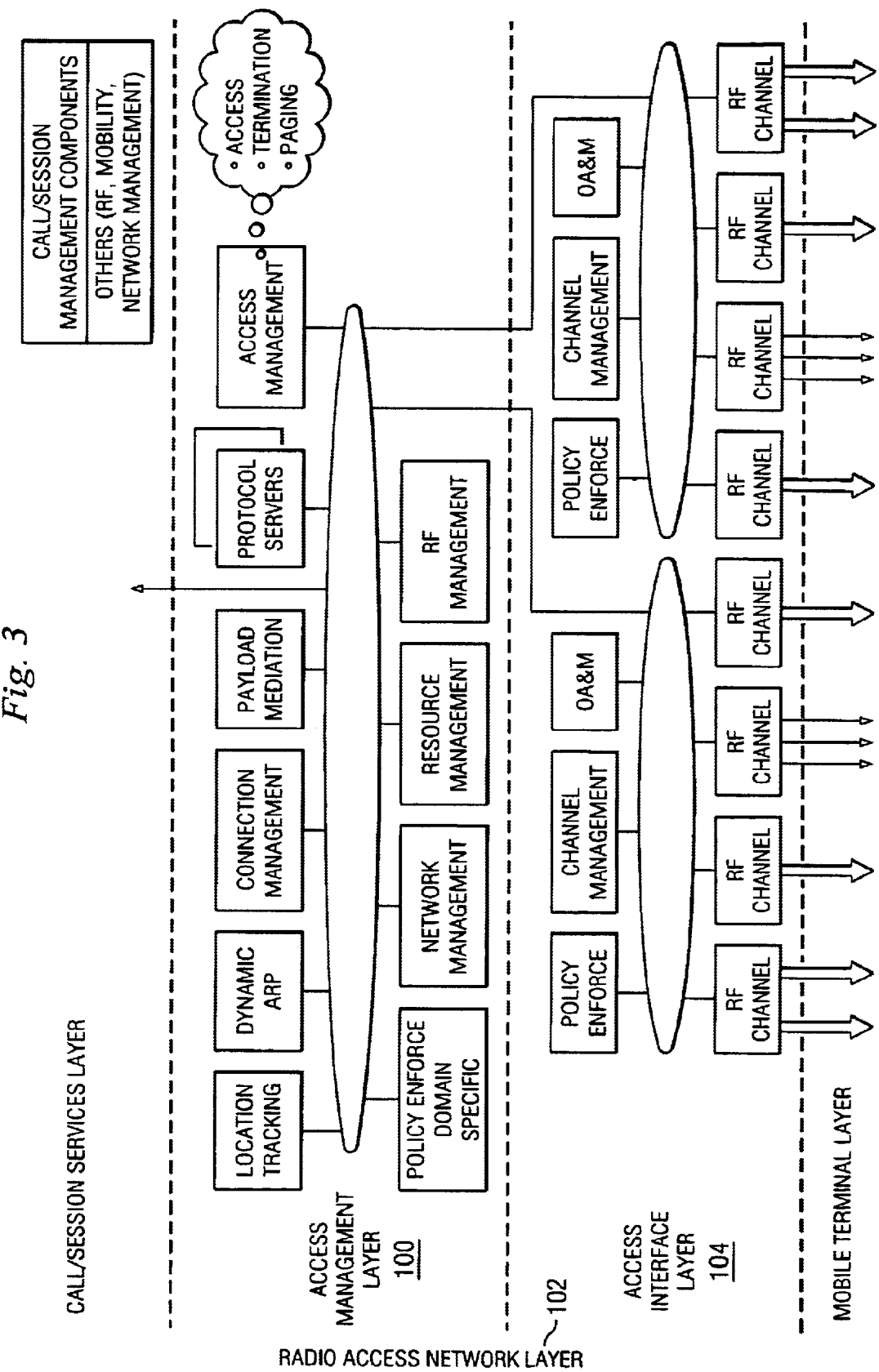
FIG. 3 is a diagram of the Radio Access Network Layer functional service components.
Figure 4:
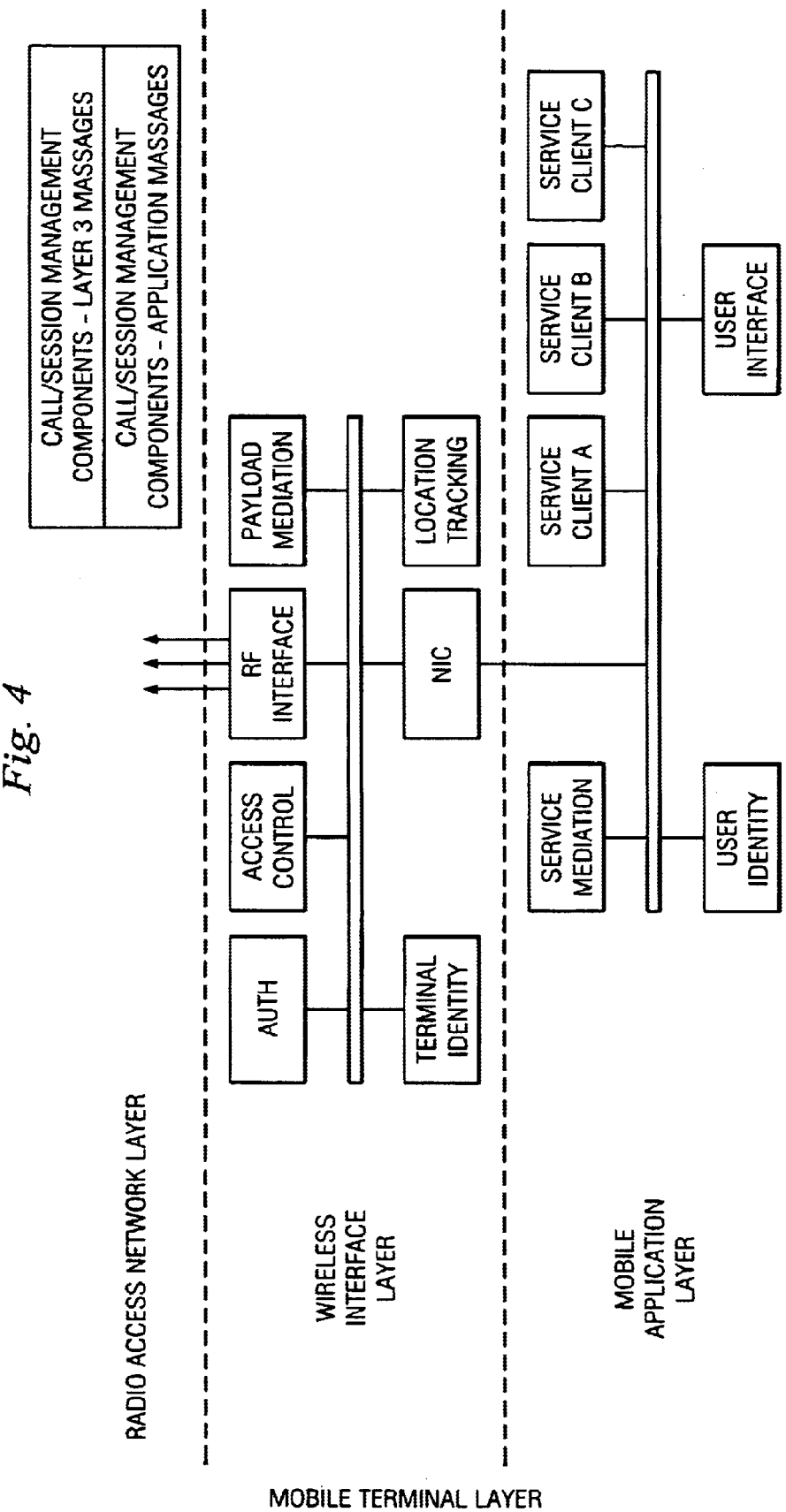
FIG. 4 is a diagram of the Mobile Terminal Layer functional service components.

The NGWN architecture provides the separation of applications/services control that interacts with the end user and management of the physical infrastructure. FIG. 1 identifies the separation of wireless access 102 from the core network 105 at the access management layer 107. FIGS. 2 through 4 illustrate the distributed architecture with suggested functional service components. The main focus of interest is on the functional service components at the LSF 106/NSF 108 network layer and the Radio Access Network Layer 102. FIG. 2 identifies the core functional service components associated with the LSF 106/NSF 108 network layer. FIG. 3 identifies the access interface and access management specific functional service components. As shown in FIG. 2, the WAG functional components 200, 202 provide the bridge function between the local service layer 106 and the access management service layer 100.

Now referring to FIGS. 1 and 2, the WAG component 101 that is attached to the LSF network 106 represents the access gateway point for the technology dependent functional components. Multiple access gateway points 202 can be attached to the LSF network 106. This provides flexibility in network scalability. The detailed functionality of the WAG components is represented by the Access Management Layer components 100 and shown in FIG. 3. The LSF 106/NSF 108 service layer functional components on one side of the WAG provide the application specific controlling functions. The access side 104 of the WAG provides the technology dependent access functions.

The access points 200 and 202 shown in FIG. 2 as the Wireless Access Gateway, separate the network in two distinct layers. First, the LSF106 /NSF 108 network layer that consists of common core functional service components required for telecommunication network. Second, the Radio Access Network layer that is partitioned into Access Interface Layer (AIL) 104 and Access Management Layer (AML) 100 consists of access interface and access management specific functional service components. Through out the description of the preferred embodiment, an access point that is attached to the LSF 106/NSF 108 (core) network layer is referred for wireless access point. The separate access point is required because of the different air technologies used for wireless access. Likewise, any other technology such as a wireline telecommunication system or a LAN based system can be attached to the LSF/NSF network layer. For different types of access points attached to the core network, the appropriate corresponding controlling core functional service components can be added and configured into the network.

The LSF/NSF service layers provide the core network functions. Some of the core network functions are listed in Appendix B. Depending on the scalability requirement of the network, the functional service components within the LSF 106 and NSF 108 network layers can be distributed or consolidated based on the desired hierarchy.

Figure 8:
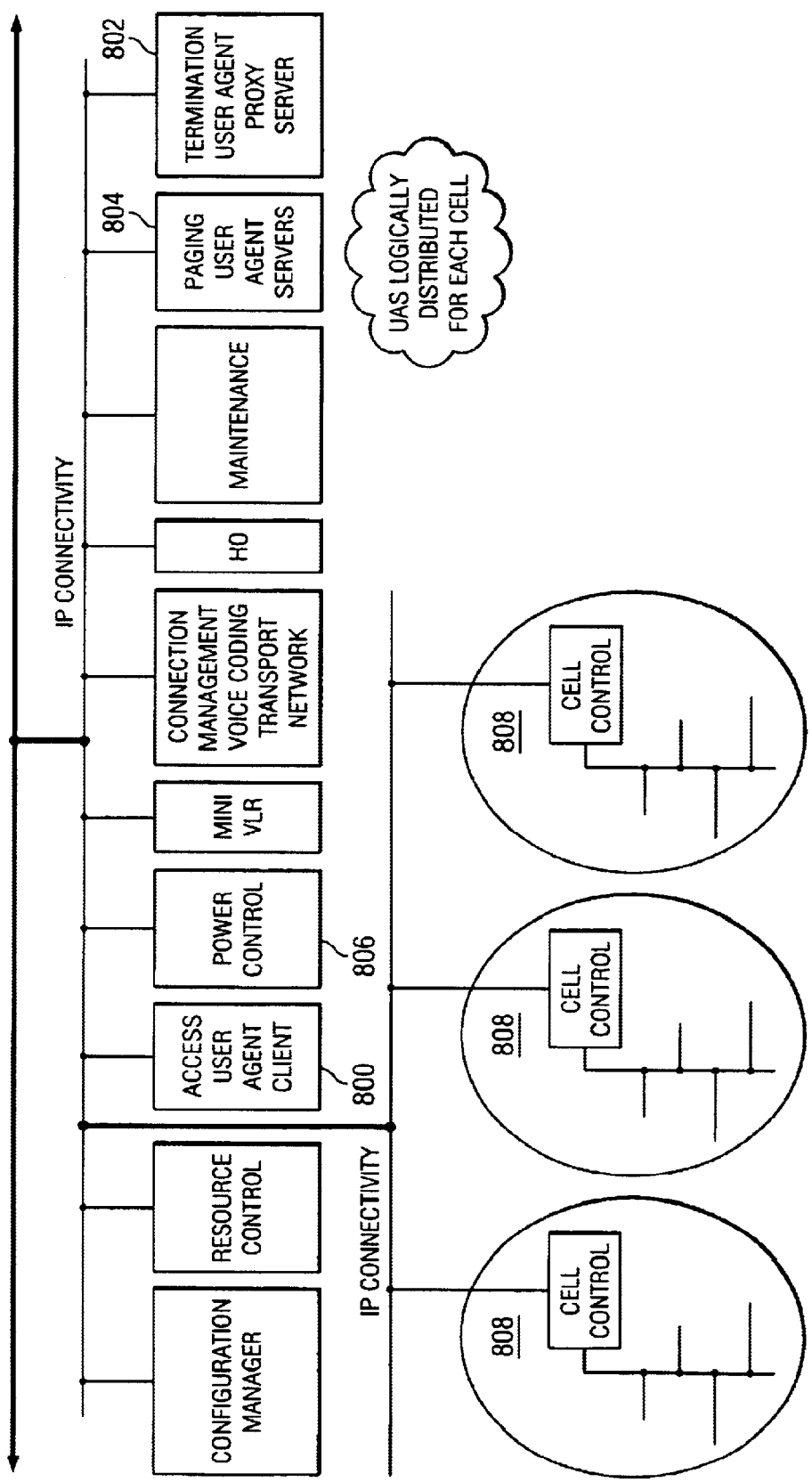
FIG. 8 is a diagram of AML functional components.

The access management layer 100 as shown in FIG. 3 provides the controlling functionality relevant to access management and RF management activities. Please note that the RF management activities and access management activities are part of the Radio Access Network layer 102. However, only RF management activities are closely coupled with the AIL 104 and access management 100 activities are closely coupled with the core network. Thus, it is possible to separate the access management activities from the RAN layer. Another major activity is the connection management function. The RAN also provides other associated functions such as local decision making domain specific database, resource control for radio resources, transmission facilities associated with the connection management function, and network management activities. These functions are illustrated in more detail in FIG. 8. The RF management function of the AML interfaces with the AIL service components and service components within the AML. It performs functions such as channel management, resource management at the AIL level, and policy decision functionality with respect to the AIL needs. The access management functions of the AML interfaces with the core components towards the network side and service components within the AML. The major access management function includes the ingress and egress activities that take place through the access point. FIG. 8 shows distributed access management functions. The 'Access' function 800 provides ingress activities, while 'Termination' 802 and 'Paging' 804 functions provide an egress activities. The layer 3 protocol signaling messages between the mobile host and the serving network received at the AIL are distributed to the pre-configured functional service components. The layer 3 protocol signaling accomplishes basic inter-working activities with the terminal device. Some of such activities include mobility management activities, location updating, radio resource selection, power control adjustments 806, and channel assignment and reassignments. Also, it may include network layer (L3) originated call control and supplementary services as traditionally used in legacy mobile systems. The AML components are pre-configured to communicate with the AIL components and tunnels appropriate signaling and data information.

The AIL Components Provide the Radio Access Functions.

Now referring back to FIG. 1, the AML 100 is the dividing point 103 between the core network 105 and access dependent controlling functions 102 and 104. The components within the access management layer 100 take the role equivalent to the policy enforcement while the LSF 106/ NSF 108 (core) service layer components provide the role equivalent to the policy decision. In order to expedite the policy decision and also to take advantage of the distributed infrastructure, the WAG (the access point attached to the LSF network) domain database is considered at the AML, which facilitates the policy and subscriber related default parameters and access related status information.

The functionality of various functional components in each service layer is out of the scope to describe in the description of the preferred embodiment. However, Appendix A provides a brief description for some of these components. The access management functional component as shown in FIG. 3 plays an important role in providing call/session management services. The distribution of access management component functionality along with other AML components is described in FIG. 8. The access management component performs ingress and egress activities. Logically, access management functions can be further distributed into access (origination) function for ingress activities and termination 802 and paging 804 functions for egress activities. These functions can be physically located in a single (access management) server 800. However, they can be distributed in different servers as they provide distinctly independent functionality. These functional service components are capable of sending/receiving application level messages (from/to user) as well as layer 3 protocol messages over IP (from/to AIL) that take place between the mobile host and the serving network. The detailed functions of these components are described later. However, a brief description is provided here to establish context.

The access management 800 of the AML takes the role of user agent in the network domain. Within the access management function 800, the access function takes the role of user agent client. With respect to the call/session management service perspective, this functional component handles ingress activities such as registration and origination. Similarly, the termination function 802 takes the role of user agent server and provides the proxy functions for egress activities. The paging function 804 is the further distribution of the egress activities that is associated with the users at the cell level 808. The location-tracking function (defined as handoff function later) handles handoff activities. The location-tracking function interfaces with the LSF service layer component—mobility manager for periodic location update, and inter system (WAG to WAG domain) and inter network domain controlling functions such as handoff.

Interfaces Between Network Entities

The functional service components are, distributed in appropriate network service layers as shown in FIG. 2 and FIG. 3 that interact with each other using various interfaces. Although the logical interface model is not shown in the figures, the lower layer (L1-L2) interfaces (shown in FIG. 5) are assumed to be Ethernet. The interface at the transport layer is either TCP or UDP that is based on the delay sensitivity and reliability requirement. The "other" in FIG. 5 indicates the support of application level framing (ALF) and support of timer associated with transport layer protocols in order to enhance transaction level capabilities such as controlling congestion and canceling transactions. Application layer protocols are text based and based on the currently being defined Internet protocols.

The logical interface model includes primary control and data path interfacing to the Wireless Internet. Unlike the LAN based application interfaces in most interfaces mentioned in this model, the air link interface is a specific interface. The mobile host interfaces at the serving network on the technology dependent air interface uses network layer protocol messaging. The radio access interface layer, as shown in FIG. 3, terminates the network layer air technology dependent messages. Based on the type of messages received at the access interface layer, they are distributed to the pre-configured functional components at the access management layer. Detailed procedures are explained later in the description of the preferred embodiment.

Although the details of the Mobile Terminal Layer are not discussed much in the description of the preferred embodiment, FIG. 4 shows an example of how the functionality of the mobile host can be separated into two layers: a wireless interface layer and a mobile application layer.

Application Inter-Working

Figure 5:
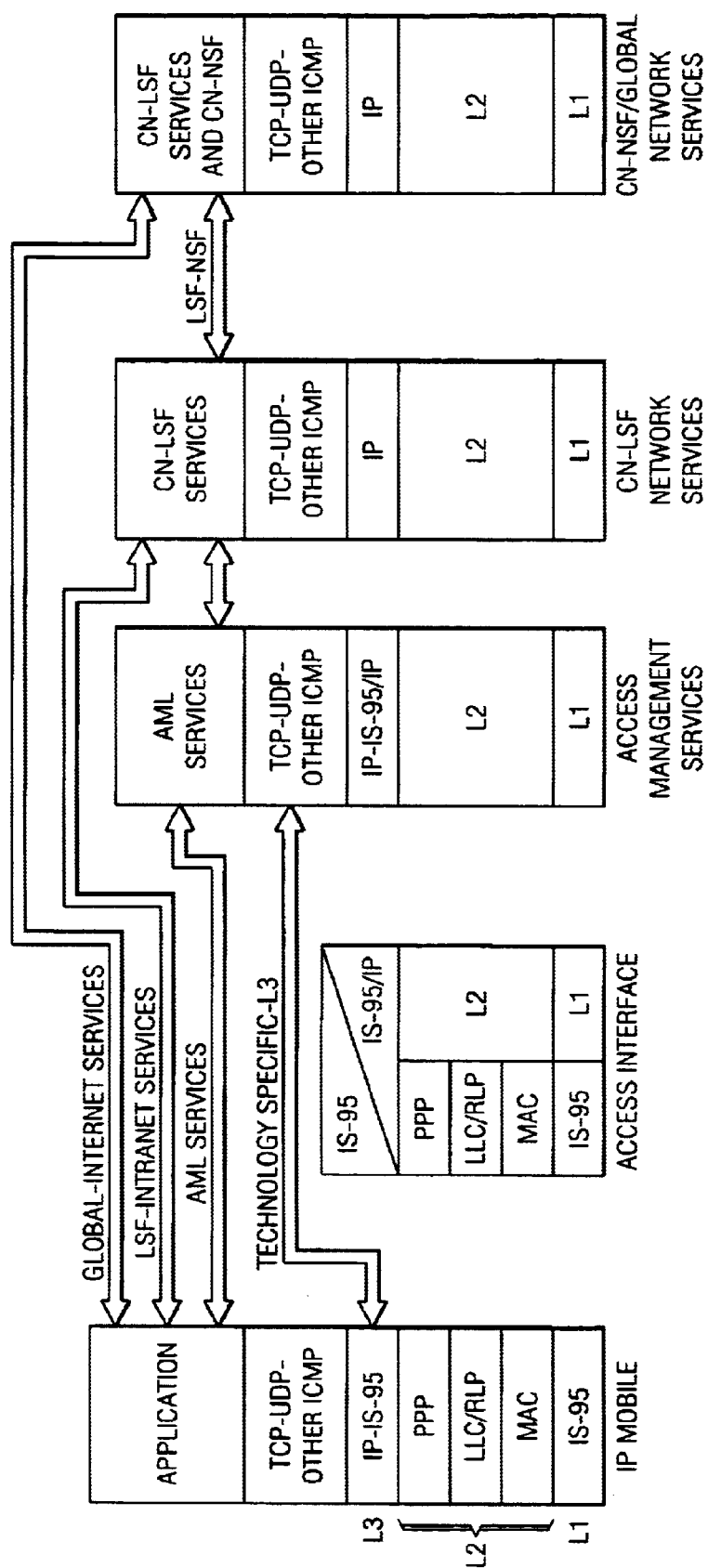
FIG. 5 is a diagram of Protocol layers and interactions.

FIG. 5 depicts the protocol layers and interactions between network entities. It establishes the main context for application interactions between various network components. It shows the protocol interfaces between OSI layers that inter-work to accommodate air interface and LAN based connectivity. The description of the preferred embodiment only focuses on activities that take place above the transport layer in case of LAN based architecture and at the network layer in case of air interface.

The following sections describe the interactions between mobile host and access network components, mobile host and local serving function components, and mobile host and home network components.

Interactions Between Mobile Host and Access Network

The Access Management Layer and the Access Interface Layer are the part of the Radio Access Network. The AML service components provide the access dependent control functions. The technology dependent network layer (L3) protocol terminates at this point. The AML service components are logically distributed into different functions as shown in FIG. 8. A signaling distributor between AIL and AML distributes messages to the pre-configured functional components (servers). With respect to the call/session management services, the access, termination and paging functions play an important role. These components interface with the LSF service components in order to provide services to the AIL and the mobile host. The LSF service components interface with the NSF service components in order to provide services to the access management components.

The following interactions occur between the mobile host and the access management service layer:

The AML components interact with the network layer of the mobile host to establish an access session. (L3/IP between AIL and AML)

The AML components interact with the AIL components to bring the mobile host on the traffic channel.

The AML components interact through the connection management component to establish point to point protocol path that allows the mobile host to access any other IP capable devices.

The network preferred call/session control services are handled through the access management components.

Handoff, power control, and paging functions related handshakes with the mobile host are controlled by the AML components.

Interactions between mobile host and CN/LSF network service components

The LSF network service components provide specific services to the access management components during establishment of an access session and service session with the mobile host.

The subscriber management and policy decision services are provided during an access session establishment with the mobile host.

The policy decision services are provided during user session invocation.

Intranet services are provided by the LSF service components through the specialized application servers.

Interactions between mobile host and CN-NSF/Global network Service components

The NSF network service components provide services to the LSF network service components during establishment of an access session with the mobile host.

The subscriber management services are provided during an access session establishment with the mobile host.

Facilitate to publicly available server accesses.

Direct home network accesses.

Interactions between network service layers

Inter-Working Between Service Layer Components

The access management layer components and the LSF/NSF service layer components are the main network components that play the significant role in controlling call/session management. The functional components within an access management layer are the edge components through which mobile users in a area accesses the core network for access establishment service, service session invocation service and intranet services or external network access services. The AML is comprised of many distributed functions. These functions are explored in subsequent sections including access (Origination: User Agent Client), termination (Termination: User Agent server), protocol servers (optionally at AML but not at LSF service layer), power control, resource control, handoff, paging, and connection management (Transport Network). The functions within LSF/NSF network service layer include service broker, session server, payload mediation, and AAA+ (accounting, authorization, and authentication) servers. The components are described in greater detail later.

How these components interact with each other as well as with end user and establish an access session, service session and transport session is also described later in the text. The access function facilitate to establish an access session that interact with the mobility manager to provide the functionality and the context needed to grant and support the user in accessing NGWN—Wireless Intranet services. Typical access functions performed by the network domain include an establishment of an authentication, authorization, usage selection, and usage constraints. At the end of establishing access session, the serving network is configured and provisioned with the subscriber's profile to provide appropriate access role, and usage role to the end user. Further, appropriate access functions are instantiated within the access management layer that interacts with mobile host to facilitate service session invocation and monitoring usage functions of the network resources. These instantiated functions interact with the session and accounting servers during the service session. The access functions within the AML take the role of User Agent in the network domain.

The session server component of the LSF/NSF network service layer facilitates establishment and maintenance of a service session. It provides the functionality needed to satisfy end users' request for desired services. The functional components within the LSF/NSF network service layer provide services to the access management layer and to the end user in establishing functionality and context involved in the negotiations of parties, configuration and QoS to be associated to the execution of a service. These services are unlike the call model services that facilitate in establishing connection-less or connection oriented call/session.

The AML of a particular domain must establish an association with the session server of the LSF/NSF network service layer in order to provide call/session services to a mobile. It is possible for the AML to have association with multiple session servers. However, the AML must associate with a single session server to complete initiated transaction. It is also possible to have many transactions during call/session establishment. During each transaction the AML may use a different session server. This implies that the AML maintains call/session states.

The session server provides services such as address translation, location service, and bandwidth management and admission policy control. It interacts with the AML for instantiated access functions to provide desired call control and other session services to the mobile host.

The session server is capable of accessing any of the AML components. This enables the session server to update the domain specific local database within the AML, monitor resources and achieve flexibility (optional) to manage-connections for traffic. Updating local domain database provides necessary intelligence to the AML components to perform default capabilities quickly and efficiently. Also, the session server uses services from home (global) network components (NSF) for the purpose of authentication, authorization, accounting, policy related decisions, and globally provided services. The session server performs the function of redirect server in terms of SIP context.(SIP Session Initiation Protocol—RFC 2543) or similar to gatekeeper function in terms of H.323 context for the call/session control services.

The connection management component of the AML provides the function of establishing transport session that establishes an end-to-end virtual connection, and handles multi-point and multi-media connections. It interacts with the session and accounting servers for policy and usage monitoring and reporting functions.

Call/Session Management Specific: Components, Services, and Procedures

This section describes call/session management relevant functional service components within each network service layer and services and procedures that establish access session and transport sessions. The service components within an access management layer of the RAN layer and service components within the local service layer of the LSF/NSF network services layer plays an important role in providing call/session management services.

Access Management Layer (AML) Components

Figure 7:
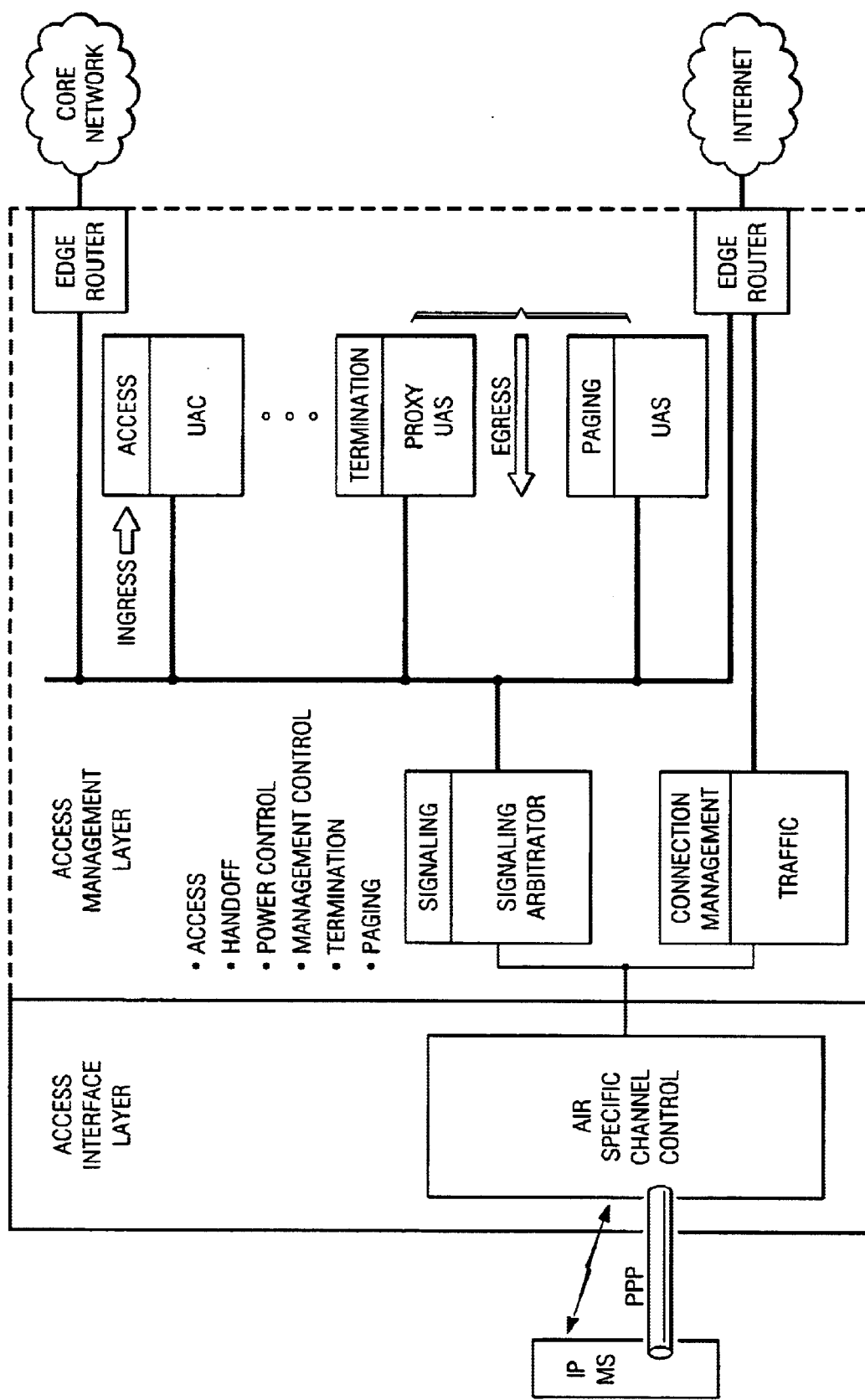
FIG. 7 illustrates the connectivity of the Access Management Layer.

The AML functional component position is between the radio access interface layer and the core network components as shown in FIG. 1 and FIG. 7. The AML component performs controlling and policy enforcement functions. It controls activities that take place at the access interface layer. Also, it controls interface activities associated with the user during access session establishment and service session invocation. It controls connection management activities that establish and monitor the point to point and point to multi-point virtual packet channels.

The network and user specific preferences are executed here based on the policy decision provided by the LSF/NSF network layer service components. The local domain database is updated with limited relevant information during access session establishment and service session invocation that expedites real time critical policy decision execution. For an example, an origination request arriving at the access management server examines the requested bandwidth with the allowed default permission through the local domain database. If the requested bandwidth matches with the allowed default, an access management server facilitates the requested bandwidth through the resource control function of the AML. If the requested bandwidth is other than default, an access management server may consult with the session server to take further action.

These functions can be physically distributed in different servers within the AML as network capacity demands. The AML functions (i.e. components) are pre-configured with the local service layer components to provide services to the mobile host during access session establishment. Additional components are instantiated and configured at the end of access session establishment. This is done based on the capabilities granted to the users and network capabilities to provide additional services.

Figure 6:
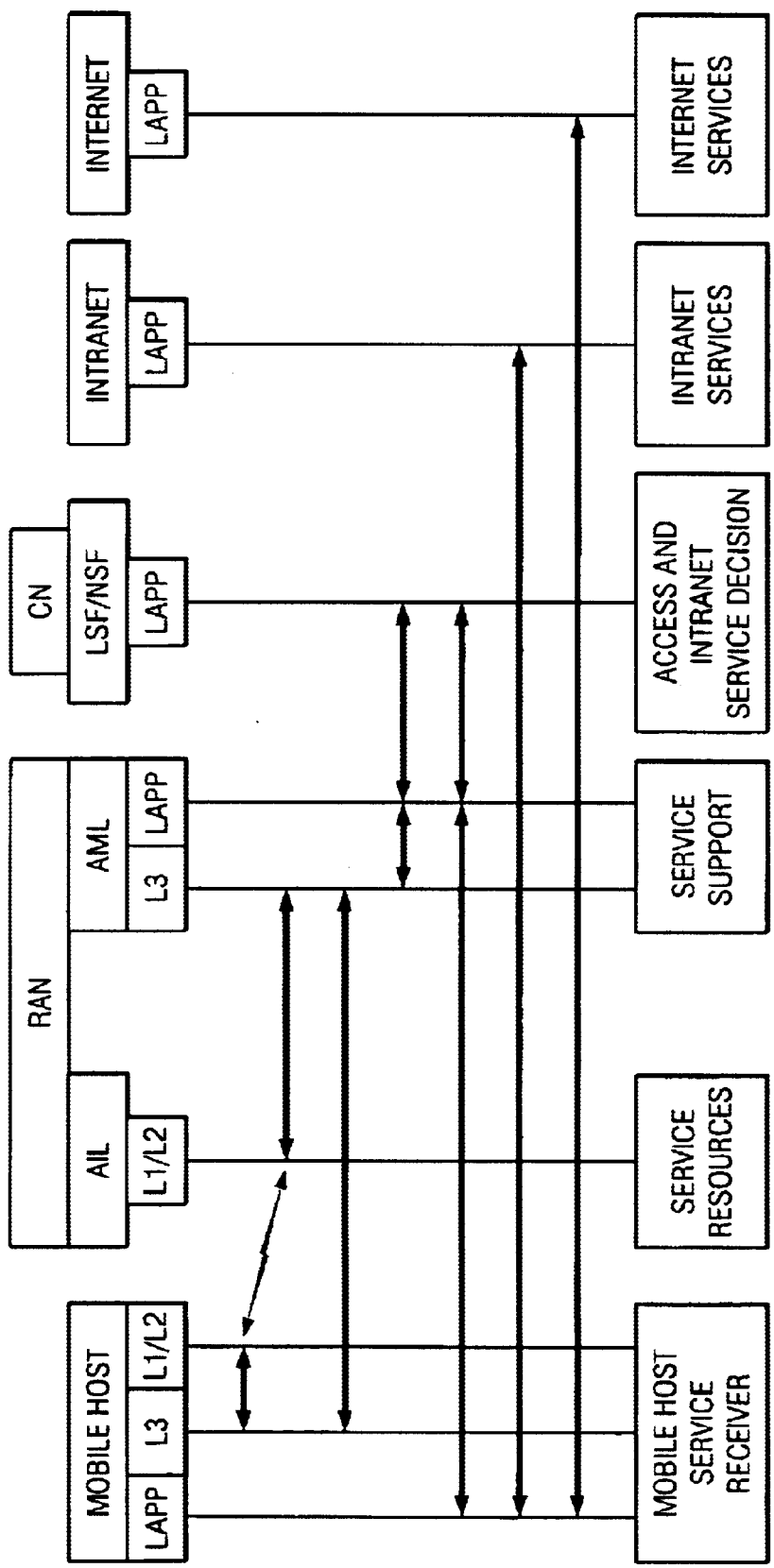
FIG. 6 is a diagram of Service layer interfaces.

FIG. 6 illustrates how some of the components within each layer interfaces to some of the other components and is only meant to illustrate an example of the components described in detail throughout the description of the preferred embodiment.

FIG. 7 illustrates the respective position of AML in Wireless Internet. FIG. 8 illustrates the functional components within the AML. The functional components within the AML are pre-configured with a signaling router that interfaces between AIL and AML. The signaling packet to/from the radio access interface layer arbitrates at the signaling distribution function of the AML and distributes to the pre-configured AML components based on the type of signaling (e.g. related to call/session processing, mobility management, supplementary services, radio resource, etc.). An access function plays an important role in ingress direction while termination and the paging functions play an important role in egress direction. The access function takes the role of user agent on behalf of the end user. An access function involves in initial dialog with the mobile host. At network layer, the mobile host communicates with the access function using network layer messages. Intelligence at the access function uses local domain database in performing default services. For higher-level policy decisions, it accesses the session server at the LSF network service layer.

Activities of the AML Components are Described Below:

Access function—Access function takes care of ingress related call/session management activities. These activities include registration and origination. An access function is the first signaling termination point with respect to ingress call establishment. It executes the policy enforcement functions. The access function of the AML takes the role of a user agent in a serving network. It interfaces with the mobile host to provide access session establishment service. During initial registration, it interacts with the mobility manager of the LSF network layer component that facilitates the subscriber management services. Upon successful completion of the subscriber management services through the mobility manager, the local domain database is updated with user and network preferences. The local domain database provides the local decision point functions. This expedites the domain specific activities during service session invocation and through out the active access session.

Further, an access function facilitates the establishment of a traffic path (establish PPP link) between the mobile host and the connection management component. The purpose of this action is to establish an access session between the mobile host and the serving network. The access function of the AML does this in two steps. First, the access function interacts with the RF management (resource control as shown in FIG. 8) component to bring the mobile on a traffic channel. Second, the access function interacts with the connection management component through which the PPP protocol messages handshake to establish IP address service point at the mobile host. The mobile host can negotiate the choice of IP address to be used; either network provided or mobile provided. This establishes the transparencies between the mobile host and the serving network. The access function informs the session server of the LSF network layer about the completion of the access session.

At this point, the session server has direct addressing capability to the mobile host to provide user capabilities and network preferences. Based on the usage and preferences granted to the mobile host, an appropriate service session manager function is instantiated within the access management layer domain. The user application interacts with the service session manager for service invocation and network service requests.

The access function takes the role of either user agent client or user agent client proxy depending on the need that is based on the capability of the mobile host. Please note that access function implies that the activities may be provided by an instantiated session server manager or handed over to the appropriate protocol servers. When the mobile host is capable to control call/session-handling activities, the mobile host takes the role of user agent client. The access function provides the role of user client proxy if requested. The mobile host has choice not to use access function as client proxy and may contact any desired client proxy or directly to the end user agent server. The mobile host keeps track of state machine. If the mobile host requests to the access function to aid in further call/session-handling activities, the access function takes the role of user agent client proxy. In this case, the access function is taking role of client proxy may interacts with the session server that provides the role of redirect server. Also, the access function can play role in two possible modes. First, an idle mode in which it provides call/session-handling transaction services when requested but do not keep track of call/session state machines. Second, an active mode, in which access function provides call/session-handling transaction services and keep track of call/session state machine.

When the mobile host is not capable of handling call/session activities, the access function receives request from the mobile host. The access function takes the role of user agent client, interacts with the session server for admission control and policy decision if required. The access function performs the outgoing call/session activities. The access function keeps track of state machine.

Termination and paging function—Termination function handles egress activities related to the incoming service session (call control activities) requests. Why do we need the termination function? In an IP environment, with the fact that each IP capable mobile host is addressed by a specific IP address, an external caller when trying to reach a mobile host in a Wireless Internet, it can reach directly without any intervention from the wireless access. However, this is only true when the mobile host is attached to the serving system using its permanent IP address. Because of the transient characteristics of the mobile host it is more suitable to assign a domain specific IP address within the Wireless Internet. In this case, once the domain specific address is made globally available by linking with the mobile host's home then the external caller only needs to find domain specific termination-proxy server. The termination-proxy server associates the current location of the callee within that domain with the current paging server (user agent server).

Thus, the termination function acts as a user agent proxy server for the user agent servers associated within the AML (notice cloud shown in FIG. 8). The termination function provides the first signaling termination point with respect to egress call establishment. It executes the policy enforcement functions. The local domain database provides the local decision point functions. This expedites the domain specific activities during termination service session establishment. The termination function interacts with domain database to get information for handling incoming request. If the end-user is not recognized, it interacts with the session server of the LSF component to take further action. In terms of SIP context (SIP RFC 2543), the session server performs function similar to the redirect server. Similarly, in H.323 context, the session server performs function similar to the gatekeeper. The termination function uses services from the session server and mobility server of the core network for various services that may include authentication during termination, current location information and policy-related decision.

If the end-user is recognized (i.e. registered within this domain) and the requested service is allowed, the termination function directs the request to the appropriate paging function (user agent server) to page the end-user or activate the traffic path from either standby or dormant mode. The paging functions (user agent servers) are associated with the unique cells within the access management domain serving area. The paging functional component keeps track of the call/session state machine as it is acting as a user agent server on behalf of the mobile host.

The termination and paging function interacts with the RF management server (resource manager) to establish a radio link connection. As mobile host is attached to the serving network, a domain specific IP address is already assigned. So in terms of SIP context (SIP RFC 2543), this IP address is returned in the contact header when returning response to the INVITE message. The termination or paging function interacts with the connection management function to establish a transport session.

Protocol servers ( or functions)—The access management functions are closely coupled with the protocol servers or functions. The protocol functions are the different code points within the system specific to the type of protocol (such as SIP, H.225, H.245, RSVP, MPLS, etc.) used for the specific activities (such as session establishment, quality of service request, secure virtual path establishment, mobility specific, etc.). These functions can be part of the access management functions and instantiated for each service session invoked. Or, these functions can be separated in different servers and access management functions can hand over the specific requests to these servers as needed. The role of these servers varies depending on the type of protocols. For an example, in SIP context, such server provides functional role as proxy server. Similarly, in H.323 context, such server provides functional role as H.323 gateway.

The location of these protocol functions or servers is not appropriate at the LSF network layer as they are closely coupled with the access management activities. For the simplest network hierarchy, these functions or servers can be associated with one WAG (access point) domain. As network scalability increases, i.e., additional access points are added, other access points can access these servers established at a single geographically convenient location. Alternatively, it is possible to locate these protocol servers along with other Intranet application servers.

Once access management hand over request to the appropriate protocol servers, these servers create direct links with the end user and takes the responsibility to interact with the connection management functions to establish appropriate transport session.

Connection management function—The connection management function is the part of the AML component. It provides the third and final phase of the call/session management services that facilitates in establishing transport session. It receives transport session establishment request from the access (user agent client) function or instantiated session service manager during the outgoing service session establishment. Similarly, the termination (UAS proxy server) and/or paging function (user agent server) requests transport session establishment during incoming service session establishment. Based on the request, the connection management function facilitates to establish the point to point or point to multi-point virtual packet channel. The connection management function monitors and records usage activities. Like session service manager, the connection session manager is instantiated for each transport session establishment The connection session manager for the transport session takes care of providing required quality of service and use of appropriate network infrastructure as described earlier.

Configuration Manager—the configuration management function at the AML service layer facilitates reconfiguration of AML service layer components. It also facilitates location tracking (handoff) with addresses of neighboring location tracking components that are used for handoff activities during movement from one AML to another AML.

LSF/NSF network service layer components—There are many functional components that are involved in providing call/session management services. However, only some of these are significant for the purpose of the description of the preferred embodiment and described here.

Session server—The session server is one of the call/session management service components at the local service layer. The primary function of the session server is to interact with the AML service components to provide call/session management services. More precisely, it interacts with the access function and the termination function within the access management server of the AML service layer. Also, it interacts with the connection management function at the AML for usage monitoring and recording purpose. Once the access session is established between the mobile host and the serving access network, the access function interacts with the session server. At this time, the session server may configure the mobile host with available network preferences and users granted capabilities. Also, the session server provides important IP addresses to the mobile host (possibly using html) that can provide value-added services. The call control services are some of the many other services the mobile host can invoke. The session server at the LSF service layer along with access and termination functions at the AML service layer provides most of the call/session control services. The typical functions facilitated by the session server includes address resolution, call/session admission control, policy control decisions and access accounting control.

Other issues such as address translation and finding terminating proxy servers are not explored here. However, it is important to mention that the session server is assumed to perform functions similar to the redirect server identified within the SIP component definition (SIP RFC 2543). An identification of functionality for admission policy control and bandwidth management is the challenge with respect to the $3^{rd}$ generation infrastructure. In addition to these, the role of session server in providing location-based applications and its interactions with the mobility manager server is also a challenge. These issues are differed at this time.

Database management (directory services)—The call/session functions related to a subscriber are typically based on the subscriber's profile. Such information in wireless network is typically centrally located at the subscriber's home NSF layer or at global level. In order to take advantage of the distributed network, subscriber's profile and related information need to be distributed in appropriate domains. Such distribution should be to a level where access point dependent components (e.g. session server, MM server) and radio dependent components (e.g. functional components within the AML) can take necessary decision independently. Such distribution will expedite the call/session processing and reduce the lengthy delay involved in accessing centrally located database and hence improve performance.

Call/Session management services—The ultimate objective of the Wireless Internet is to provide the end user an access through the network, provide choice of user desired services (Intranet or external Internet, etc.), and finally, the control and monitor capability for network resources used. The call/session management services facilitate these objectives. Three basic functions were briefly identified earlier. These functions are listed in the following paragraphs again.

Establishing an Access Session Between the Mobile Host and the Serving Network

The establishment of an access session facilitates the mobile host to attach to the serving network. During the establishment, subscribers' are authenticated and granted for requested or default bandwidth with desired quality of service. The local decision point within the access management layer is updated and appropriate service components get configured. Once the access session is established, the mobile host becomes IP capable enabling access to/from any other device. The access session remains active at all times as long as the mobile host remains attached to the serving network.

An Invocation of a Service Session by the end User

The user can invoke a service session. The call/session control service is one of many services that the user can invoke. The session server at the LSF service layer facilitates the call/session management control activities. At this point network becomes capable of providing basic call/session control services. However, the network is also capable of providing simple to complex services.

The user is provided with user capabilities and network preferences to use desired services from the serving network or access external services. Based on the user capabilities and network preferences with respect to the type of user, the network configures itself to respond to the user service invocation.

For example, in the management of basic call/session control services, the session server manager is instantiated at the access management layer that provides the user interface for call/session control services. While at the LSF service layer, instance of a session can be created at the accounting server to handle accounting activities for any service session. Similarly, for any other service, the appropriate session manager can be instantiated to respond to that specific desired service. The application servers are configured at the LSF service layer.

This allows the ability to keep access relevant activities coupled with the access dependent service layers, and policy decision making activities at the access independent layers. Also, this allows flexibility to provide mixture of independent services and add new services.

Facilitating Network Resources to Establish Point to Point or Point to Multi-Point Virtual Connection Distinction between the call/session control services and other applications/services is emphasized throughout the specification for clarification purposes. The call/session control services are the part of the access management services that facilitate establishing point to point and point to multi-point virtual connections.

Access session establishment—The mobile host establishes point of attachment with the serving network. The mobile hosts on power up or during idle state periodically sends registration or location update request to the serving network. The access interface layer components facilitate an air link communication with the mobile host. Upon receiving registration request, AIL distributes it to an access management server component within the AML. The access management server consists of many functions. They are identified in FIG. 8. They are access, termination and paging functions. These functions have independent functional role and can be separated in different servers if network capacity demands. In this section when access management server is referenced implies an access function of the access management server. The AIL distributes signaling information to the appropriate servers depending on the type of signaling. Optionally, such distribution can be implemented at the AML.

Figure 9:
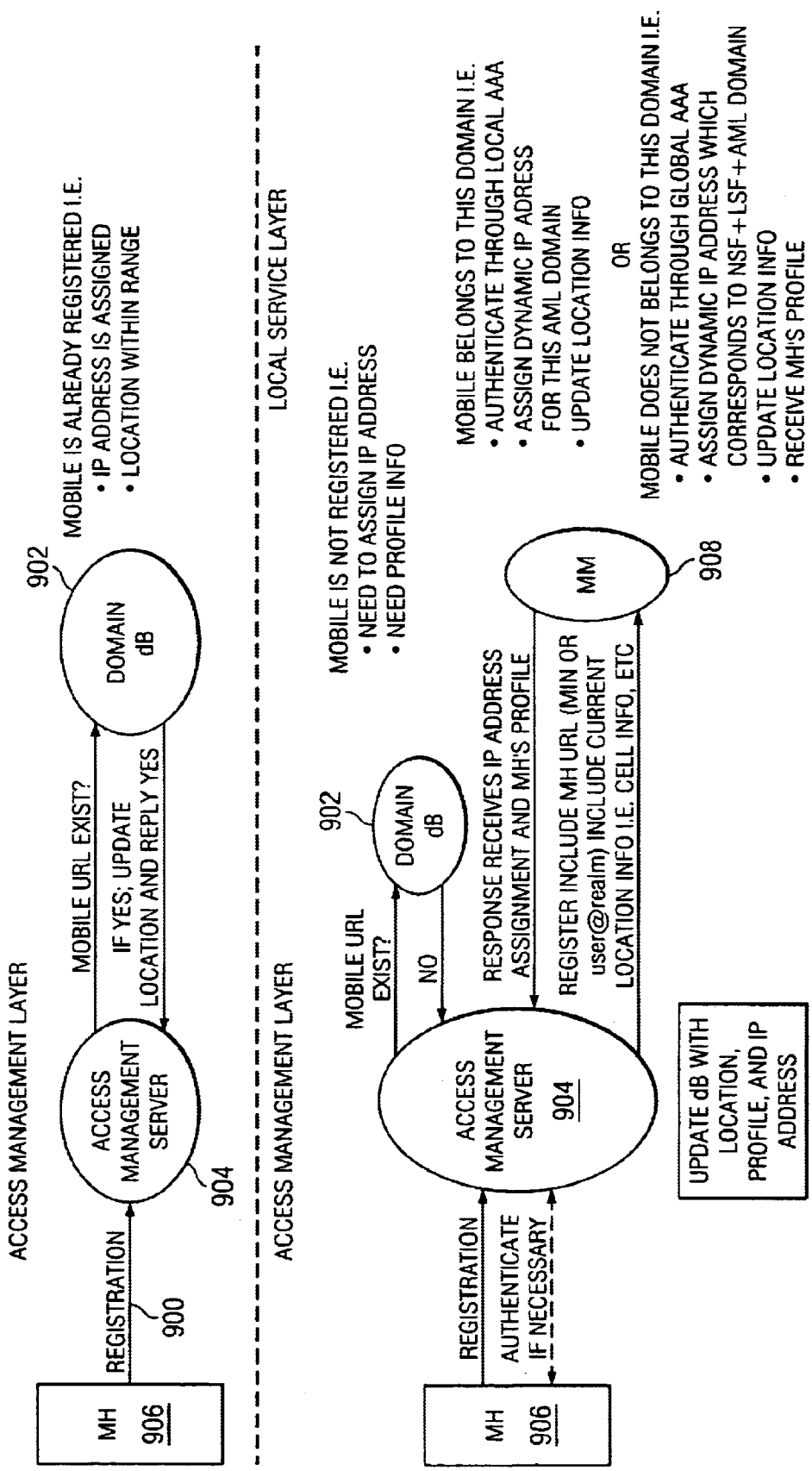
FIG. 9 is a diagram illustrating step 1 of the access session establishment procedure.

Now referring to FIG. 9, the access management layer processes the registration request 900. The domain database 902 within the AML provides the local decision point to the AML components to make primary decisions. The access management server 904 checks with the domain database 902. If the mobile host 906 is already registered, mobile host's current location is updated. If the mobile host 906 is not active within this domain, the access management server sends REGISTER request to the LSF service layer component—mobility manager 908. A SIP message, REGISTER is shown for examples that access management server sends to the mobility manager 908. It includes MIN or "user at domain" location information that identifies cell information.

Although the activities performed by the mobility manager 908 will not be described in great detail, a brief outcome of this activity is described here. This is the first step in establishing an access session between the mobile host and the serving network. The mobility manager 908 receives the REGISTER message. This indicates that the subscriber needs to be authenticated for access and authorized for the requested services. The mobility manager performs this task with the help of other LSF service layer components such as AAA+, directory services, DHCP, and policy server. If the mobile host is active within the regional serving domain, the LSF service layer components provide the service functions. I.e., an authentication is done through the local AAA server, an IP address assignment through the DHCP that is suitable to the AML domain, and subscriber's default profile is updated at the AML domain database as well as at the regional domain.

Figure 10:
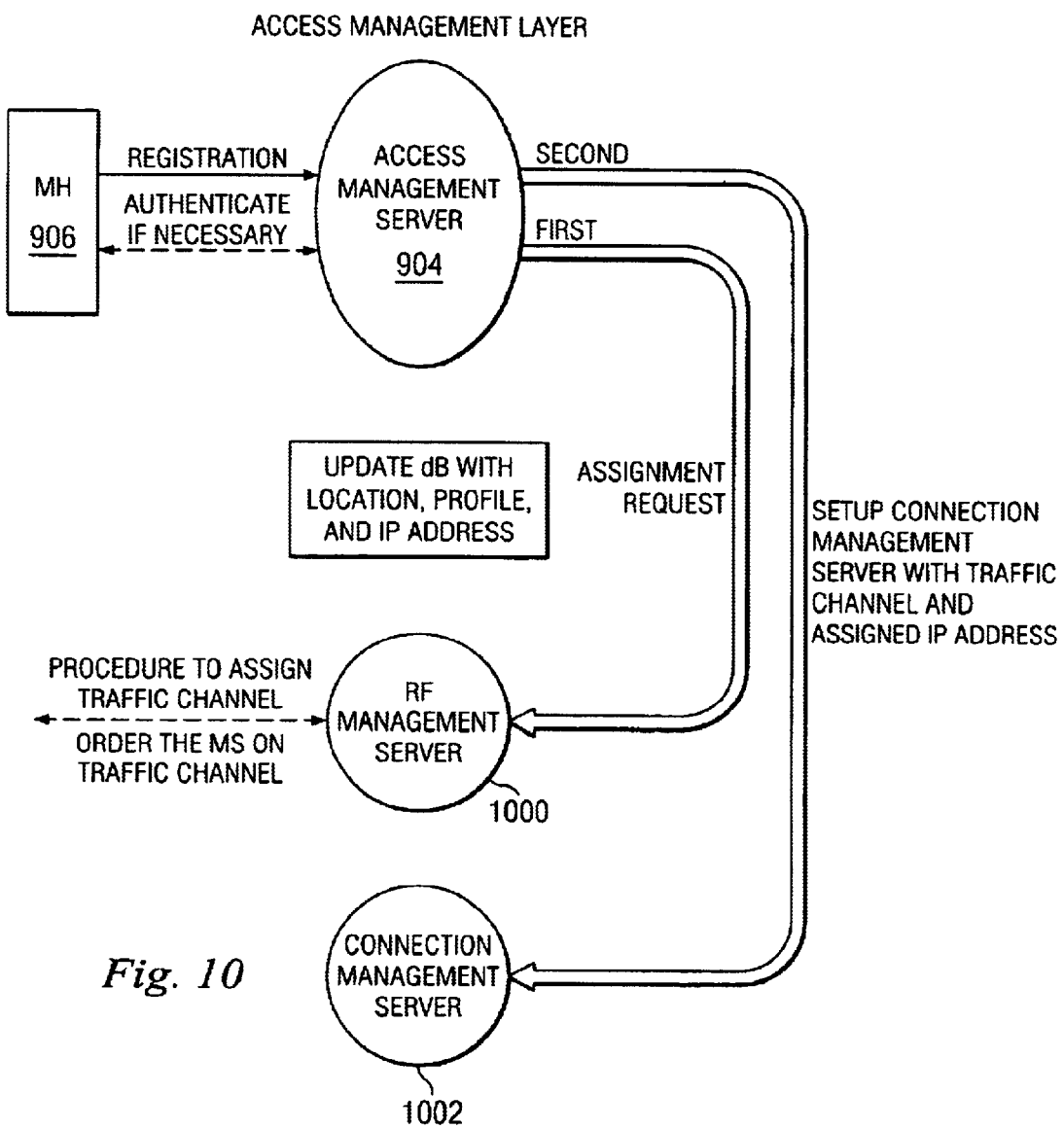
FIG. 10 is a diagram illustrating step 2 of the access session establishment procedure.

Once the authentication and authorization process is complete, it is assumed that the RAN is authorized to provide access to the mobile host. Now referring to FIG. 10, first, the access management server 904 interacts with the RF management server 1000. The access management server 904 instructs the RF management server 1000 to assign a traffic channel. The RF management server 1000 interacts with the access interface layer components and facilitates the sending of appropriate air link messages to the mobile host. The RF management server 1000 notifies the access management server 904 once the mobile host 906 establishes the traffic channel. At this time, data link connectivity is achieved between the mobile host and AIL. Second step is to establish PPP connection between the layer 2 of the mobile host and the connection management server 1002.

Figure 11:
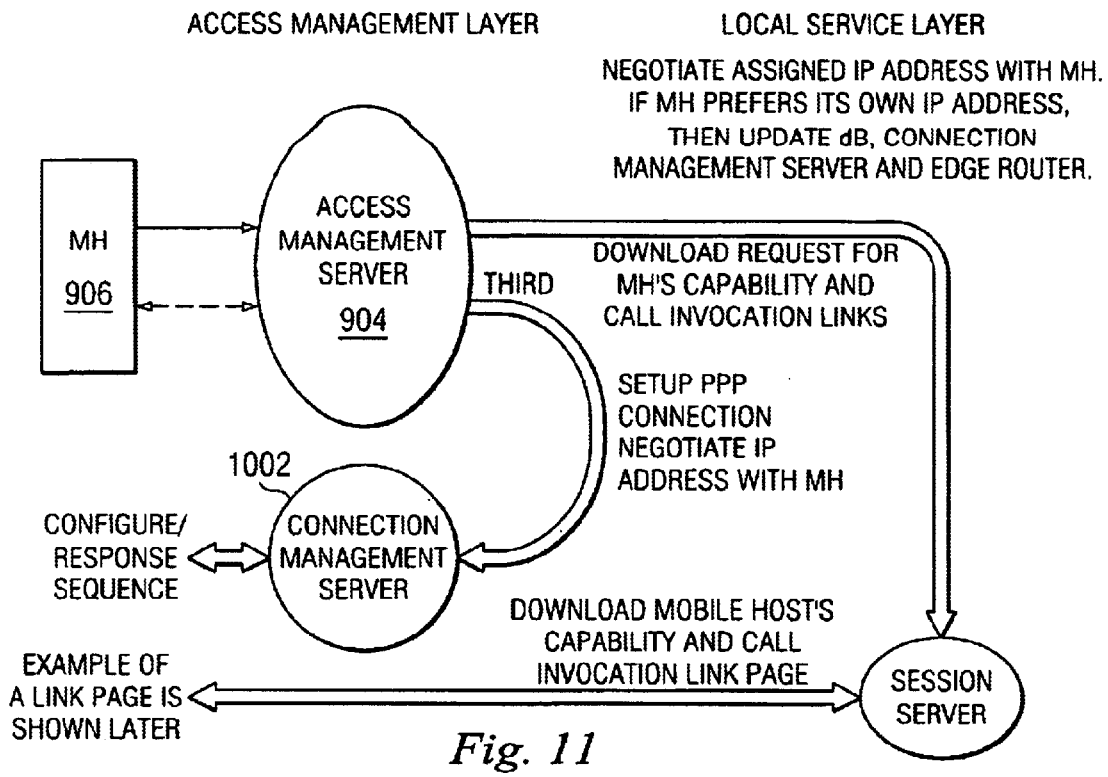
FIG. 11 is a diagram illustrating step 3 of the access session establishment procedure.

The access management server 904 then starts to interact with the connection management server 1002. First, it establishes the co-relation between traffic channel and assigned IP address at the connection management server 1002. Now referring to FIG. 11, the access management server 1002 handshakes configure/response layer 2 PPP connection messages with the layer 2 of the mobile host through the assigned IP address at the connection management server 1002. At the mobile host 906, layer 2 establishes an IP address service point link with the layer 3 (IP layer). During this handshake, the mobile host 906 accepts the network assigned IP address or provides a desired permanent IP address instead. In case of the latter, the access management server 904 reconfigures the connection management with a new IP address and also updates the appropriate hierarchical databases.

Figure 12:
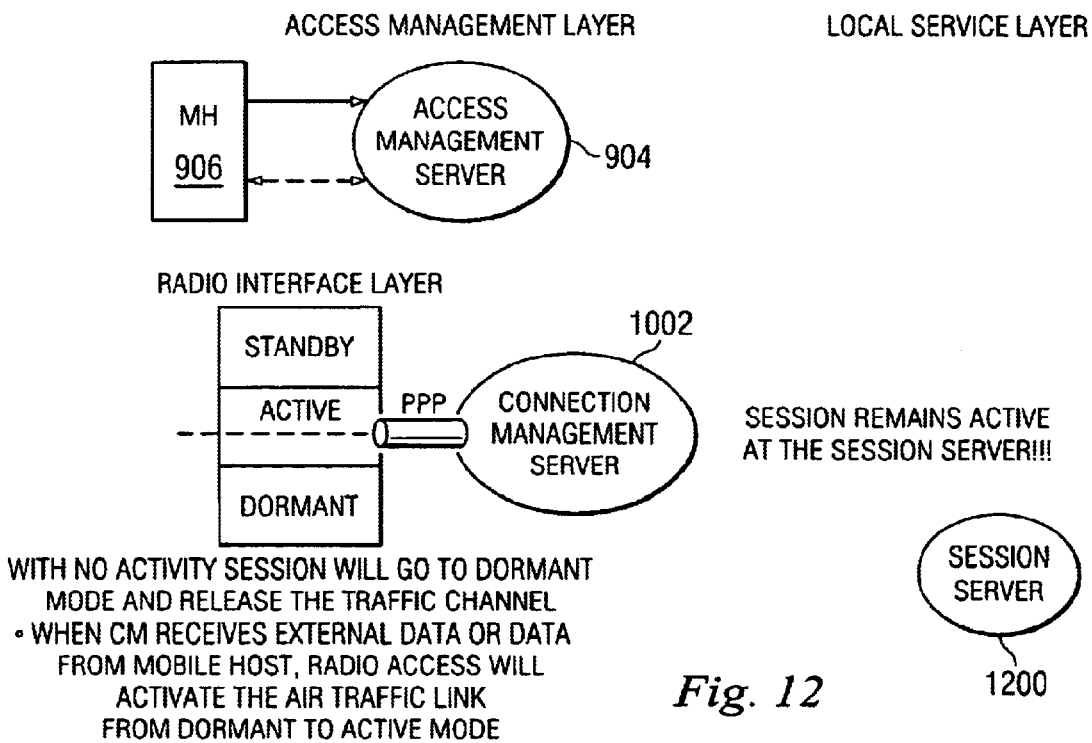
FIG. 12 is a diagram illustrating step 4 of the access session establishment procedure.

At this point, an access session is established between the mobile host 906 and the session server 1200 at the serving network as illustrated in FIG. 12. The application layer at the mobile host 906 becomes IP capable and can access any IP addressable device. The air link at the layer 2 is in the active mode. This link remains active for a pre-determined time that is based on the MAC layer specification. With no activity on air link, active status of this link changes to standby mode, and later goes to the dormant mode and then the traffic channel gets released. However, the established access session at the access management service layer remains active. This access session remains active until association of the mobile host is removed or deleted at the access management layer. When any data activity happens, either from the mobile host or from the access network, the air link turns from dormant mode to the active mode.

Invocation of Service Session

Figure 13:
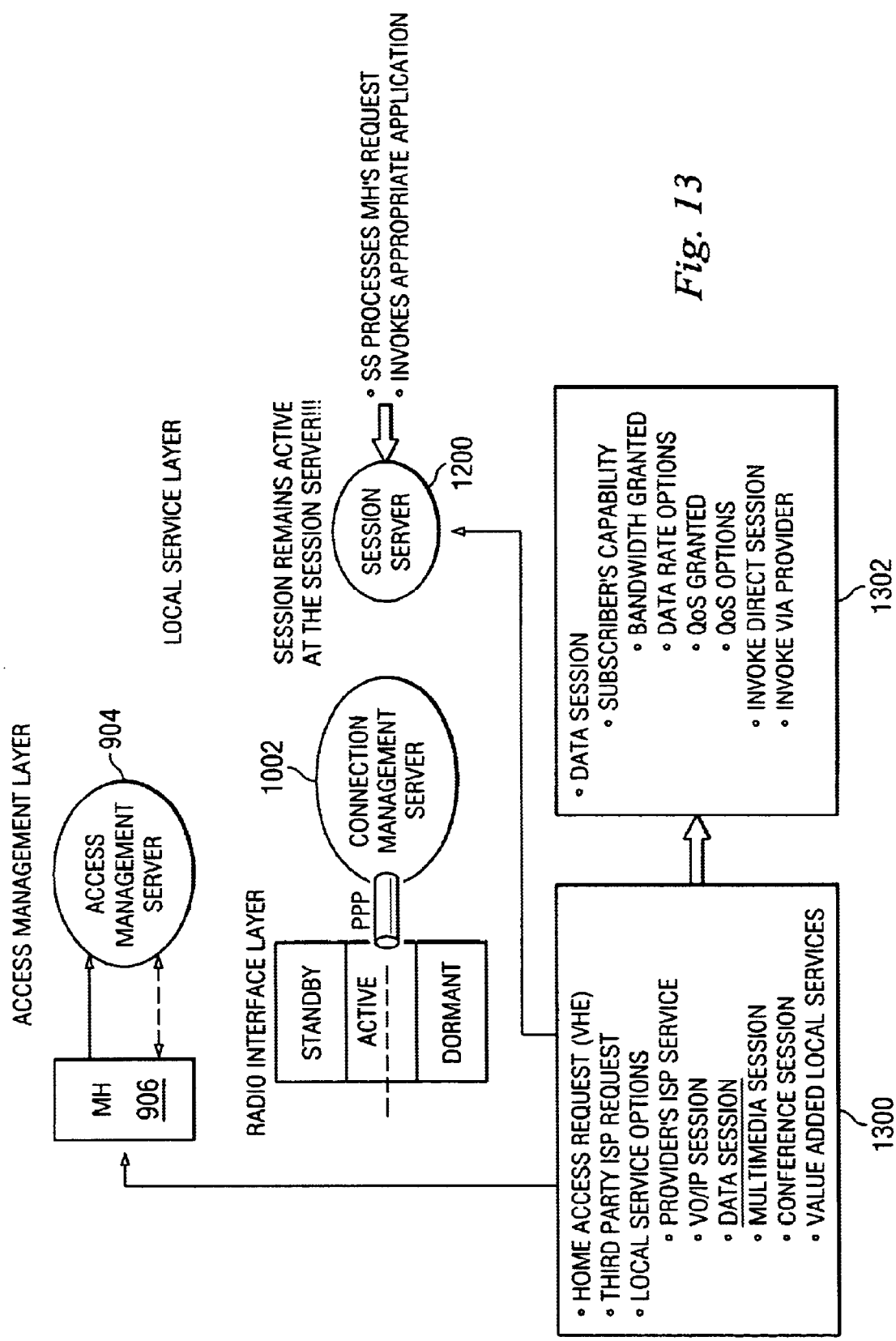
FIG. 13 is a diagram of the service session invocation procedure.

Now turning to FIG. 13, once the mobile host 906 establishes point of attachment at the session server 1200 within the serving network, the mobile host 906 becomes capable to invoke any services. The mobile host 906 can access any IP addressable device. The serving network can help provide locally or globally available services. The serving network becomes smarter and configured to provide services to the user. The default parameters are configured at the local decision points at appropriate domain levels.

At this time the network is capable to provide basic services. However, the network is capable and flexible enough to provide more complex services. A brief discussion is provided here for reference and will be explored later.

The serving network provides user capabilities and network preferences to the user. The user capabilities were determined during access session establishment as a result of executing subscriber management services. The network preferences based on network capabilities are pushed to the mobile client 906. Such preferences may include a choice of invoking different type of call/session control services (voice, data, multi-media, etc.) or value added services (Intranet services, location-based services, etc.). More over, the serving network can provide a choice to the mobile host of using the serving network as an ISP provider, or for other possible options. Some of these options are illustrated on screens 1300 and 1302 in FIG. 13.

Establishment of Transport Session

Based on the type of service session invoked, the service session manager (please refer to discussion on service session manager) notifies the connection management function to establish a virtual packet channel path. The connection session manager is instantiated by the connection management function that establishes appropriate network resources to establish requested transport session. The connection management function isolates activities from the call/session control activities. For example, it hides the underlying network topology and supports the inter-working between network layers. Based on the quality of service requirement (which is discussed below), the connection management function facilitates establishment of a path ranging from no packet control to fully dedicated virtual packet channel path. It may use different techniques to achieve the required quality of service. These techniques may include use of MPLS, RTP/RTCP, RSVP as well as other schemes. The quality of service requirements may include the following: bandwidth reservation for a data path (possible use of RSVP); end-to-end latency guarantees through the optimized IP network (possible use of MPLS); network infrastructure selection such as IP or ATM backbone (Layer 1 & 2 selection); protocol selection such as MPLS, RTP/RTCP, RSVP (based on quality of service requirements); and acceptability of loss of data (possibly establish limits on acceptable vs. unacceptable loss based on type of transport session established, such as voice, audio, video, etc.)

Call/Session Procedures

The call flow procedure described here uses several scenarios to outline involvement of access function. However, certain assumptions are identified in the following paragraphs.

The Mobile host should be IP capable. For example, once the mobile host is attached to a wireless access system, the mobile host can reach any IP addressable device, server or end-user directly and transparently through the network. Also, any external user or device can reach the mobile host transparently through the network.

The mobile host can seek network services for call/session establishment or dynamic change in resource allocation using standard application protocol such as SIP or RSVP.

The RAN is IP capable. Particularly, the service components within the RAN; AIL and AML are IP capable. The PPP link is established between the mobile host and connection management component of the AML. The router between the AIL and AML will arbitrate the signaling and traffic packets before forwarding to the pre-configured IP devices of the AML components. This arbitration can be done at the AIL or at the AML depending on the choice of implementation.

The functions of the AML components are distributed based on the required function. Such functions include access, termination, handoff (location tracking), paging, power control, RF management (resource control), configuration management, and connection management. Also, local domain database for local aspects is used. It provides subscriber dependant data and local policy decision parameters for system dependant data. Alternative to these local aspects, global aspect entities such as AAA+server and Policy Decision Point (PDP) can be accessed from the core network respectively.

The AML components require assuming responsibility for the end-user as a User Agent Client and User Agent Server in an ingress and egress direction respectively.

The AML component interfaces with the core network when necessary. The core network components provide either redirect server function or value added service function to the access function.

Call/Session General overview

The AML service components and the session server are the main network components that play a significant role in call/session management. The AML components are the edge components through which a mobile host in an area accesses the core network for Intranet services or external network for third-party network services or publicly available Internet services.

Thus, the AML components provide the access function. The access function establishes the functionality and the context needed to grant and support the user in accessing NGWN—Wireless Internet services. The functionality of access management server component within the AML takes the role of user agent in the network domain. Please refer to discussion on each service component.

The session server provides the call/session service function. The session server provides services to the user agent in establishing functionality and context involved in the negotiations of parties, selection of functional protocol components, configuration and QoS to be associated to the execution of a service. These services are unlike the call model services that facilitate in establishing connection-less or connection oriented call/session. Thus, the session server receives a request from the user agent and satisfies the service need. Upon access initiation or registration, the access management server component of the AML takes the role of user agent on behalf of the mobile host and interacts with the session server in establishing the requested need or service. Upon establishment of an access, appropriate network configuration takes place to serve the mobile host for its default services and network capabilities. In the process, the session service manager is instantiated that interfaces with the mobile host that satisfy the service request such as dynamic change in QoS. Please refer to the section discussing the session server.

The architecture vision is such that service requests will be facilitated appropriately by the AML components. The service session manager and transport session manager is instantiated by the access management server during access session establishment. These components provide the interface point and satisfy the end users' need and requests.

Upon terminal registration (e.g. at power up), the mobile host gets control of the radio channel and engage with a specific serving RAN in an area. The mobile hosts send registration messages to the RAN that appears at the associated access management service components. For an example, in case of a CDMA technology, a network layer IS-95 origination message is received from the mobile host to the network access interface. The AIL sends this message to the associated AML using HDLC protocol or simply in IP packets using Ethernet. The signaling IP packets are received at the edge router between AIL and AML. This router arbitrates the type of message and distributes to the appropriate AML components such as access management server, power control server, or handoff server. It is assumed that the IP security is established between AIL and associated AML, and also between identified network layers. The signaling arbitrator is configured with the appropriate IP addresses of the AML components and core network components. Thus, access related messages will be forwarded to the access management server, handoff and mobility related messages will be forwarded to the handoff server, while power control related messages to the power control server, and so on. The data packets will be distributed to the connection management server.

Exemplary Functional Component Interaction Sequence Flow

Figure 14:
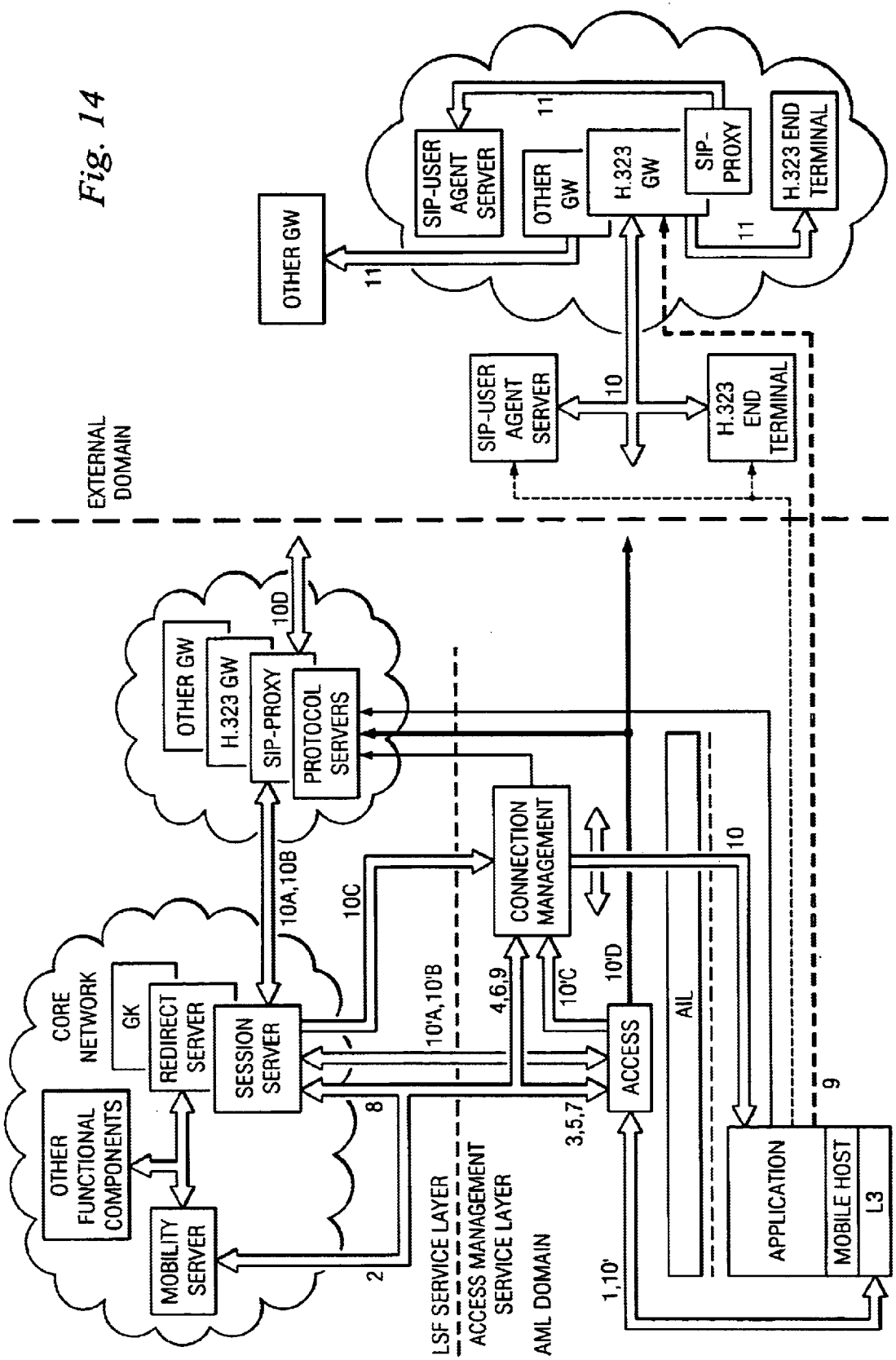
FIG. 14 is a diagram of the functional component interaction sequence flow.

Although the functions of related service components and their interactions are described earlier, FIG. 14 provides functional component interaction sequence flow. The following paragraphs describe a general overview for these sequences.

Sequence 1 is described as when the network layer (L3) of the mobile host sends the registration request (e.g. at the power up) to establish a point of presence at the serving network. The access function of the AML service layer receives this request.

Sequence 2 comes into play when the access function at the AML service layer communicates with the mobility manager at the LSF service layer. The mobility manager performs several functions for which it may communicates with other functional components at the LSF service layer and/or with NSF service layer in order to provide subscriber management services. In this process the mobility manager may communicate back to the mobile host through the AML service layer to authenticate the mobile host.

Sequence 3 gets traversed when registration is completed, the mobility manager facilitates to download information such as a subset of user specific default parameters and allowed service options to the AML domain database. Such information provides local decision point to expedite future service invocation procedures if necessary.

The access function at the AML service layer communicates with the RF management server in sequence step 4. For simplicity, the RF management server is not shown in this figure. The RF management server performs procedure to assign traffic channel.

Sequence 5 designates informing the access function upon completion of traffic channel assignment.

The access function of the AML service layer communicates with the connection management server in sequence 6. It facilitates to establish relation between traffic channel and assigned IP address. Then, the access function negotiate with the mobile host at the layer 2 through the connection management server of the AML service layer to establish PPP connection and IP address selection. The mobile host may accept the network provided IP address or mobile host may provide its permanent IP address to use.

The mobile host communicates back to the access function of the AML service layer in sequence 7 indicating accepted IP address assignment. The access function facilitates the necessary changes relative to the selected IP address at the AML domain and/or at the LSF service layer database.

Upon establishing PPP link between the mobile host and the connection management server, the access function at the AML service layer communicates to the session server in sequence 8 to download necessary information to the mobile host.

The session server downloads necessary information to the mobile host in sequence 9. The information includes: end user's capabilities that derived as a result of providing subscriber management services during access session establishment, and network preferred preferences for which network is configured to provide optimum service. Also, the session server communicates with the connection management to provision default bandwidth and required quality of service requirement corresponding to the end user.

The sequence 10 indicates the service invocation by the mobile host. The sequence 10' (10 prime) indicates an service invocation (e.g. origination) form the network layer of the mobile host. In this case, with respect to SIP, the access function at the AML service layer provides the function similar to the user agent client (UAC). The sequence 10 indicates an service invocation from the application layer of the mobile host. In this case, with respect to SIP, the mobile host application layer provides the function similar to the UAC. Based on the end user invocation of specific use of service, the mobile host has multiple options: it can reach directly to the callee (destination end user, i.e., e.g. user agent server in SIP context); it can reach to the other domain network. In SIP context, it can reach to a user agent server proxy that can terminate to the appropriate user agent server; or it can reach to the serving network's provided appropriate protocol server. In SIP context, it can reach to the user agent client proxy. The user agent client proxy can facilitate the further action to provide necessary resources and forward service session establishment request to the callee.

If the user chooses to use network provided appropriate protocol servers, then the appropriate protocol server receives the service session invocation request in sequence 10A and 10'A. The protocol server communicates with the session server that arbitrates to the appropriate controlling entity. For an example, in SIP context, the user agent client proxy will communicate with the Redirect server. Likewise, in H.323 context, the H.323 gateway will communicate with the gatekeeper (GK). The other GW performs similar functionality provided by the user agent client proxy in SIP context or H.323 gateway in H.323 context. Such gateways may include PSTN gateway, and similar others.

Sequence 10B, 10'B is the response from the session server. The session server provides information that required to appropriately forward the service session request to the callee or to the destination.

Sequence 10C, 10'C indicates when the session server at the LSF service layer or the access function at the AML service layer communicates with the connection management server to allocate allowed bandwidth and provide selected quality of service for the transport session. Such allocation will be committed upon completion of the signaling negotiation between end parties.

Sequence 10D, 10'D is the forwarding request go out to the appropriate destination.

Sequence 11 designates when the forwarding request arrives at the user agent server proxy in SIP context, or at the H.323 gateway in H.323 context, then, such entities performs necessary functions to validate for admission control, identifing location of the end user and forwards request to the end user. Similarly, the other gateway will provide the same functions.

Protocol Choices

The list of network preferred protocol preferences could be provided to the mobile host during access session establishment. The access management functions at the AML and the session server at the LSF network layer facilitate the end user with varieties of options based on the type of user's capability, subscribed options, and network preferred protocol preferences. Based on the choice of user invocation, appropriate protocol servers are accessed to establish service session. If the end user is not capable of selecting protocol options, the end user can access the access management functions. This is also a traditional way of handling request from the mobile host. The access management functions interact with the session server to determine the appropriate protocol function and facilitate the selected capability components that can establish the service session. The request is hand over to the appropriate server to establish service session.

This scheme provides the support of any protocol. For an example, the SIP (SIP RFC 2543) and H.225 (H.225 —Call Signaling Protocols and Media Stream Packetization for Packet Based Multimedia Communications Systems) & H.245 (H.245 —Control Protocol for Multimedia Communication) protocol stack can be supported independently and transparently. Also, legacy protocols can be supported in the same fashion.

Wireless Access Scenarios

Figure 15:
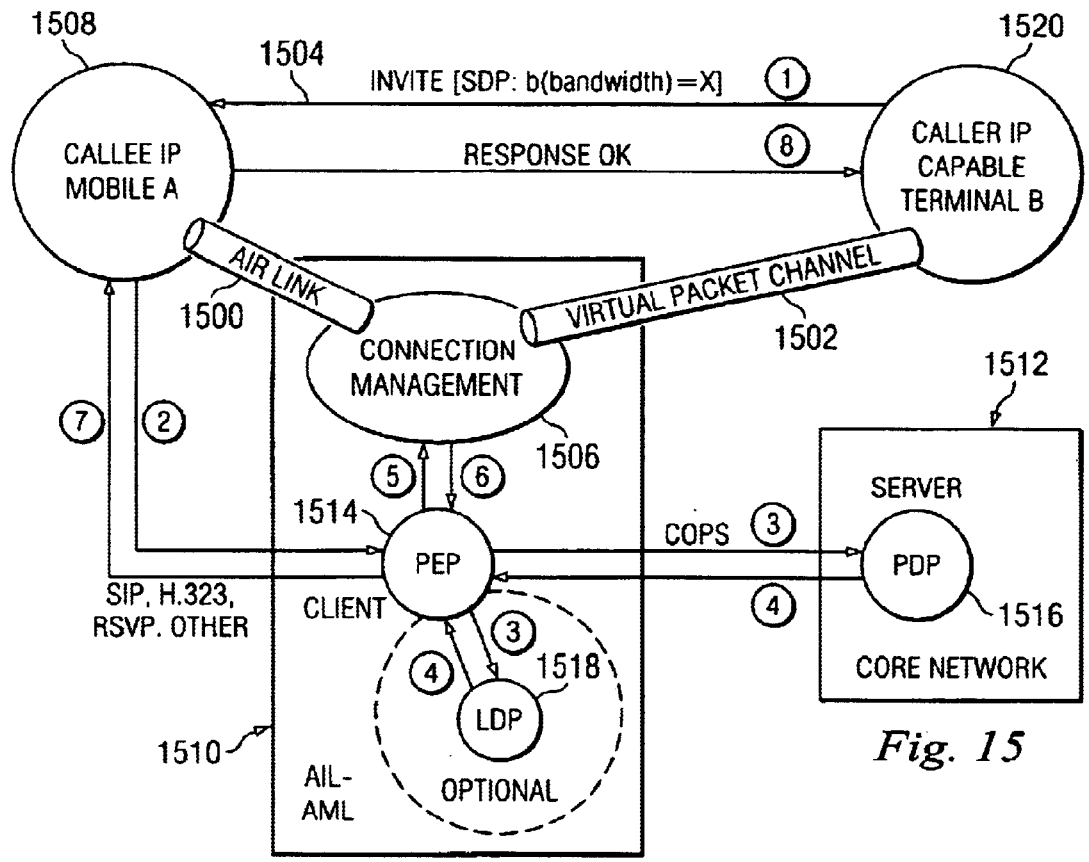
FIG. 15 is a diagram of an overview of an access scenario at the AIL–AML.

Two paths are illustrated in FIG. 15. The first facilitates control of the air 1500 and the virtual packet channel path 1502. The second facilitates signaling interactions 1504 with the core network to establish session and allocation of local resources. The two distinct channels through which traffic data flows are identified in the following paragraphs.

One Through the air Link and Another Through the Virtual Packet Channel

The virtual packet channel 1502 can be established through all the routers along the data path using RSVP (following PATH—RESV signaling sequence between routers). Thus, the control of the virtual link and dynamic bandwidth changes can be obtained by using RSVP processed at each router along the data path. However, the control of the air link is not trivial. This is because of two reasons. First, the data transformation at the connection management 1506 does not distinguish data from signaling and thus, does not process the signaling protocol. The RSVP signaling is merely transported through the wireless access point to the end terminal. Thus, it becomes the end terminal's responsibility to interact with the access point to allocate or modify the bandwidth necessary for the air path. This leads to the second point where bandwidth adjustment requires a unique signaling handshake between the IP Mobile host 1508 and the AIL-AML interface 1510.

Control of Session Establishment and Resource Allocation

Within the wireless access point, the client agent for the end user performs several functions. Some of these functions include interactions with the core network 1512. The user agent (client 1514 or server 1516) performs the role of policy enforcement while the core network 1512 performs the role of policy making decisions. Depending on the implementation choice, interactions related to the policy may be performed locally or at the core network 1512. It may be practical to distribute default parameters and the subscribers' allowed resource allocation at the time of registration to the local domain database. In this case the policy enforcement function that is a part of the user agent (access management server), performs decisions based on the local decision point (LDP) 1518.

IP capable end terminals 1520 can communicate with each other transparently. However, the wireless access point plays an important role in establishing the air link path. An intervention at the wireless access point can occur several times during the communication. These scenarios are identified in the following paragraphs.

Scenario 1

Figure 16:
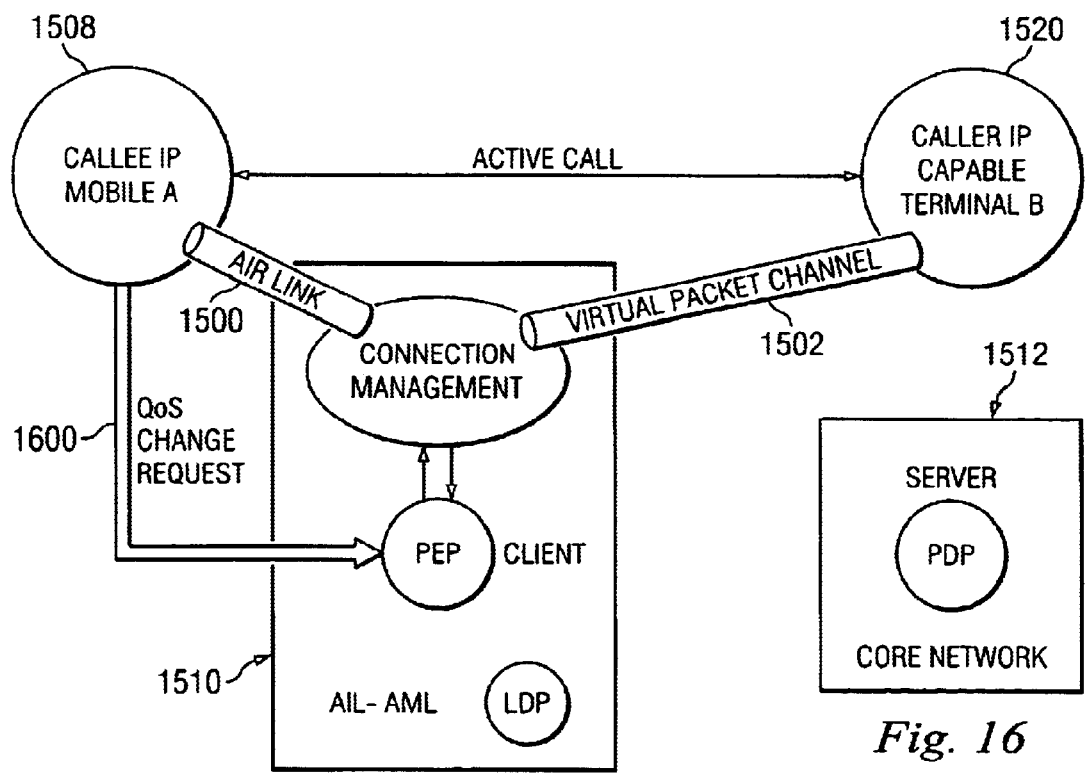
FIG. 16 is a diagram of an QoS change request.

As shown in FIG. 16, the IP capable end terminals 1508, 1520 are in active state. Assume terminal A 1508 is attached to the wireless access side. Terminal B 1520 is somewhere else on the Internet. Terminal B 1520 sends an INVITE message directly to the terminal A 1508 using the currently used call ID to modify an active call/session with different quality of service parameters than what is included in the SDP. Terminal A 1508 needs to send a request 1600 to the access system to modify the established air link 1500.

Scenario 2

Figure 17:
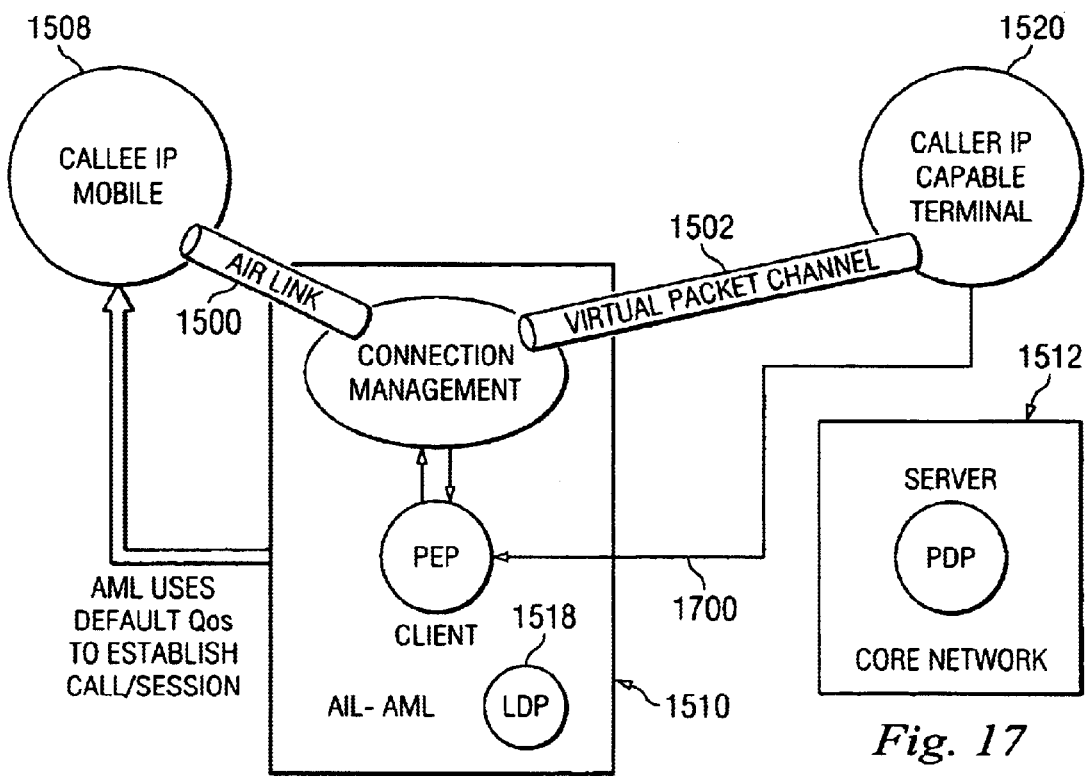
FIG. 17 is a diagram of use of default QoS to establish call/session.

FIG. 17 shows the case of a termination. When the distant client 1520 sends a message 1700, for example, an INVITE message, to the AML 1510, the message ends up at the user agent proxy server. The policy enforcement points and call admission control functions take place at the user agent proxy server. The user agent proxy server may need to access the subscriber related or the system level policy decision database. Such databases can be located locally or at some central location. The subscriber dependent database can be accessed through the local database 1518 (domain dB) for validity, profile check and current cell location if available or may be accessed through AAA server centrally located within the core network. Similarly, system level policy decisions such as allocation of subscriber requested bandwidth with respect to the availability can be checked by the proxy server by accessing local policy decision database or globally located database.

Scenario 3

Figure 18:
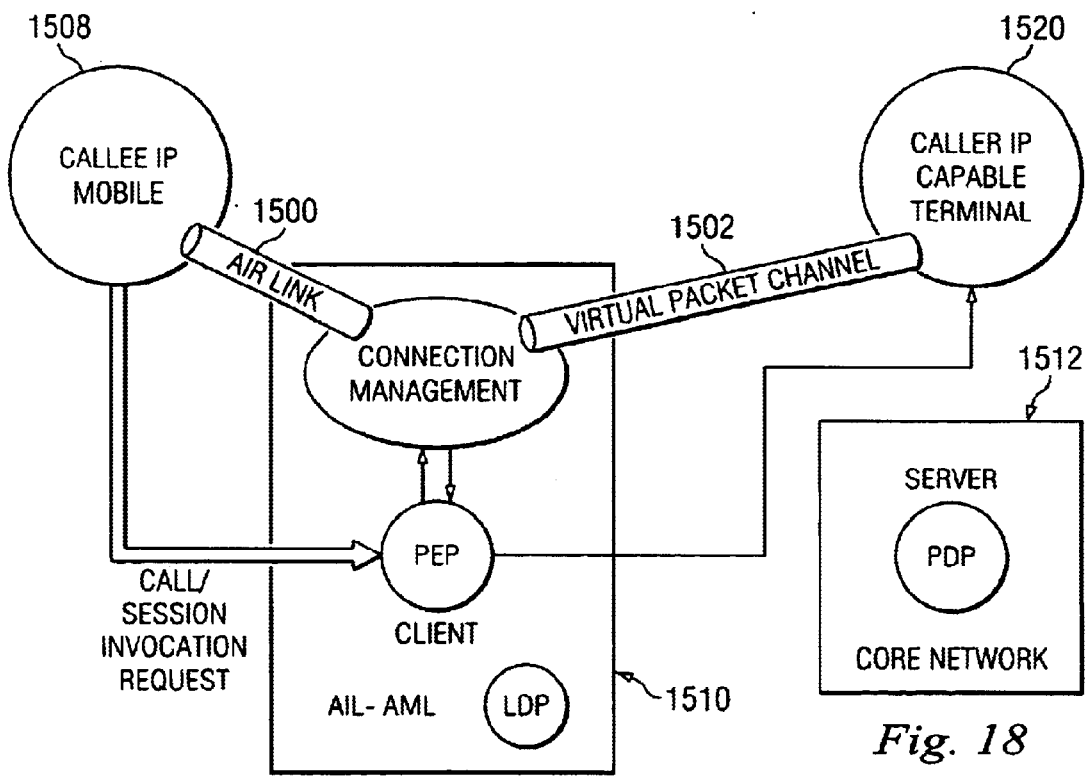
FIG. 18 is a diagram of a call/session invocation request.

FIG. 18 shows the call/session invocation request scenario. Though an IP mobile host 1508 is capable of establishing a call/session with another external device 1520 transparently without interaction of AML 1510, it is possible that in many cases the IP mobile host 1508 may request the AML 1510 to establish such a call/session. An example of such cases may include where a mobile host 1508 wants to establish a multicast call/session; it that case, it would request the AML 1510 to establish such a session. This is important mainly due to the bandwidth limitation of the air link 1500. The AML 1510 would facilitate the multicast of packets to as many sessions as needed. Another example is where trigger based services are incorporated that allow mobiles to invoke pre-established value added services offered by a local service provider or a local Intranet.

Scenario 4

Figure 19:
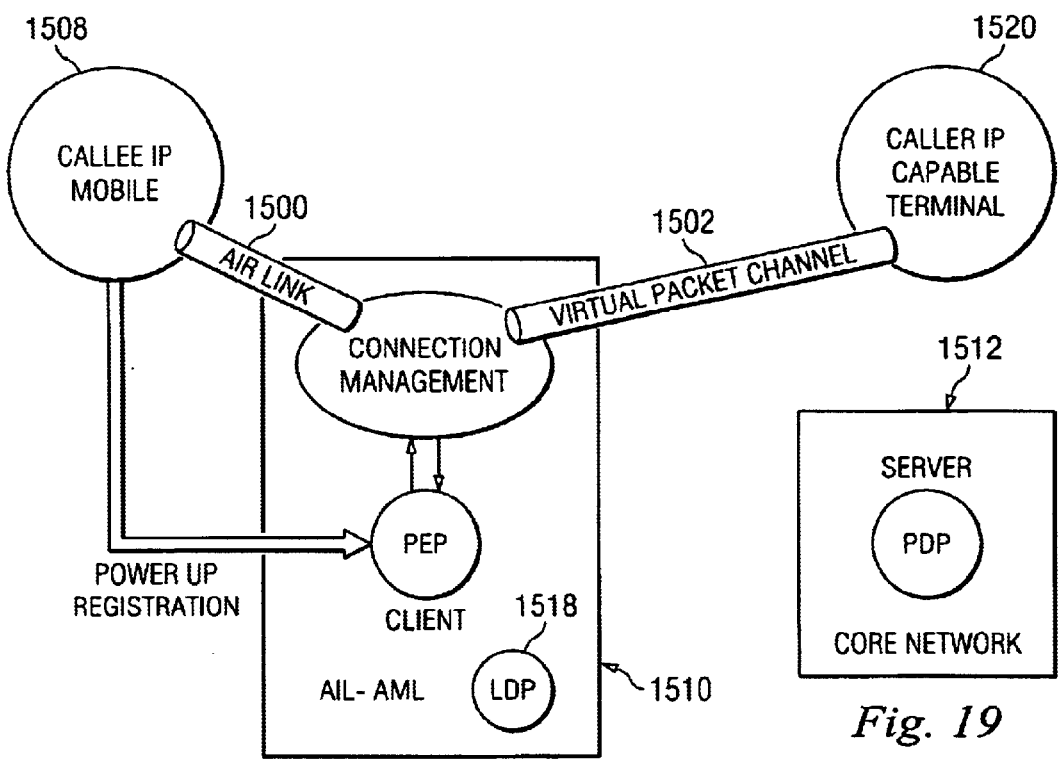
FIG. 19 is a diagram of power up registration.

FIG. 19 shows the power up registration scenario. The power up is one case when the AML 1510 is accessed to establish an air link 1500 and establish access session. Once the air link 1500 is established, the mobile host 1508 can stay in active or dormant state. In any of these cases, the subscribers' profile is kept in a local database (domain dB) 1518. QoS policy and policy enforcement points are distributed in the access (user agent client) function for ingress and terminating user agent proxy for egress activities. Depending on the QoS requested, that include bandwidth requirements at the default level.

Scenario 5

Figure 20:
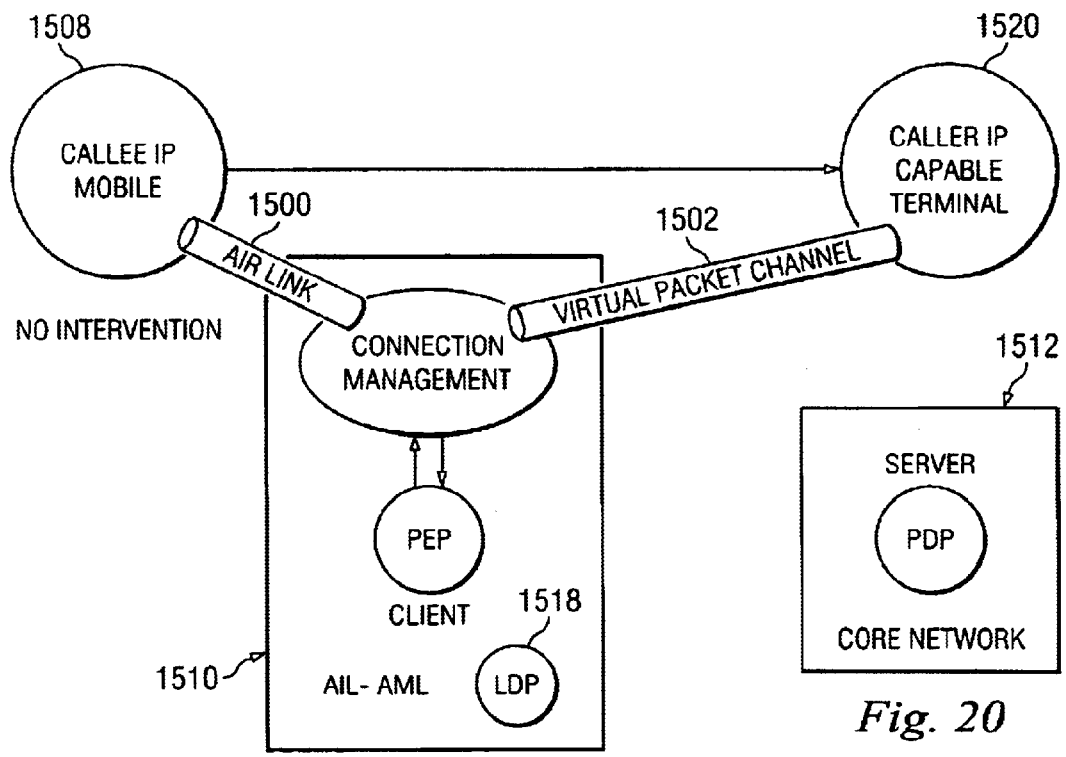
FIG. 20 is a diagram of the use of default parameters.

FIG. 20 shows the scenario where default parameters are used and no intervention is required. That means the mobile user 1508 can establish a session with an external user 1520 using default QoS parameters provisioned during access session establishment. In egress, the user agent proxy server will use default parameters to establish call/session with the user 1508 within the domain of AML 1510.

Figure 21:
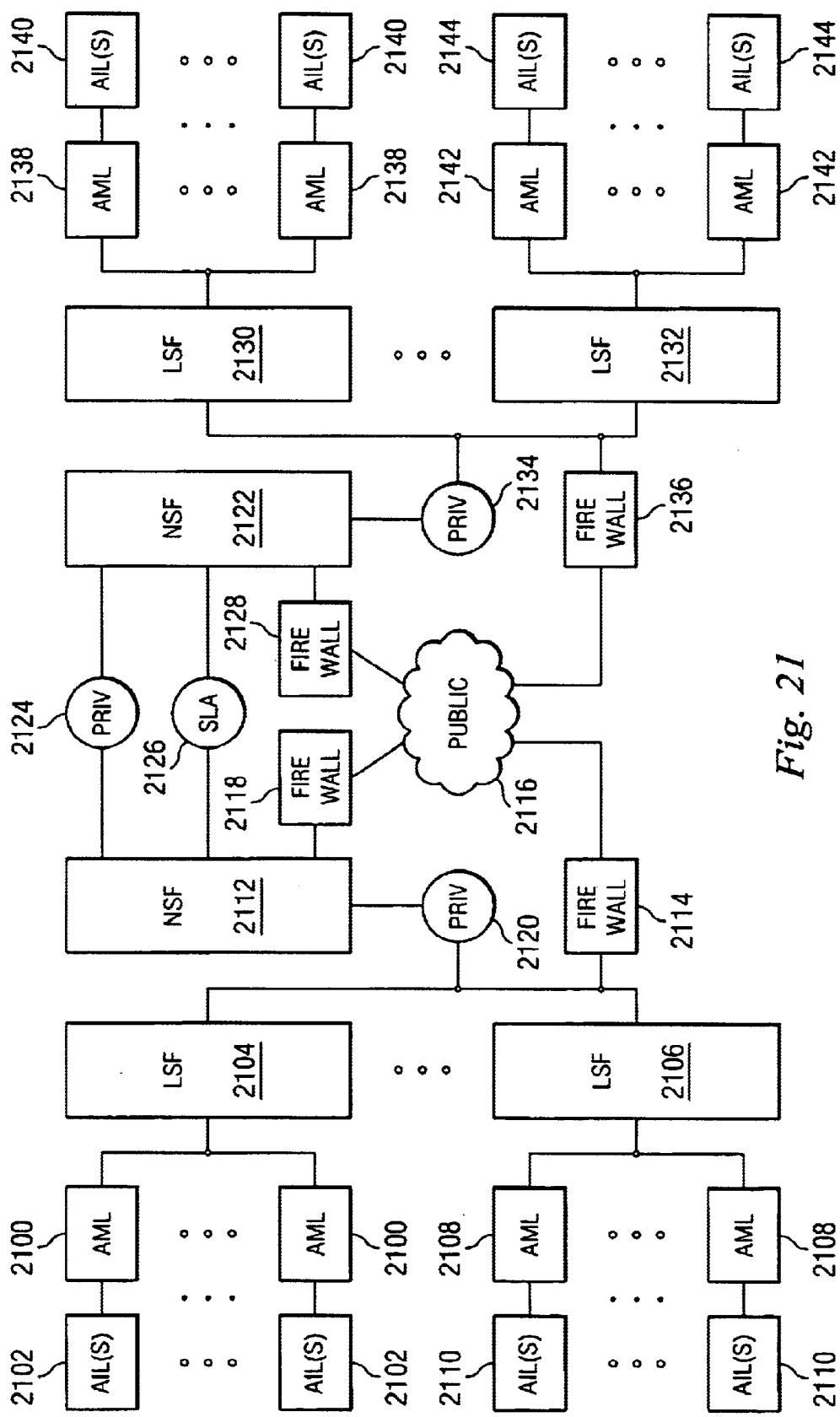
FIG. 21 is a diagram of an example implementation of the various layers of the architecture of the preferred embodiment.

FIG. 21 illustrates an example implementation of the architecture of the preferred embodiment. As shown, one access management layer 2100 can have one or more access interface layers 2102 and one local service function layer 2104 can have one or more access management layer 2100. In addition, local service function layer 2106 is also depicted with one or more access management layers 2108, which in turn have one or more access interface layers 2110. Additionally, the local service function layers 2104 and 2106 are shown to be connected to a network service function layer 2112 through either a LSF firewall 2114, the public Internet 2116 and a NSF firewall 2118, or through a private link 2120. The LSFs 2104, 2106 would use the private link 2120 if the NSF belonged to the same service provider and would use the firewalls 2114, 2118 if the NSF belonged to a different service provider.

Moreover, NSF 2122 is connected to NSF 2112 through a private link 2124, through a service level agreement link 2126 or through another NSF firewall 2128, the public Internet 2116 and the original NSF firewall 2118. Similarly to the LSF/NSF connections, the two NSFs 2112, 2122 would use the private link 2124 if the two NSFs belonged to the same service provider, the service level agreement link 2126 if the two NSFs had a service level agreement and the firewalls 2128, 2118 if the two NSFs belonged to two different service providers.

In addition, LSFs 2130, 2132, private link 2134, LSF firewall 2136, access management layers 2138, 2142, and access interface layers 2140, 2144 are depicted in the same format as the other components on the right side of FIG. 21 for simplicity purposes. However, the network could be arranged in countless ways and still withhold the relationships described above.

Conclusion

It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

Appendix A: Service Layer Functional Components

This section elaborates some of the functional components that are distributed in network service layers. The definitions given here are of generic. However, relevant details to the call/session management services are described in the specification.

Policy management & Policy enforce server—The policy management server defines business and service concerns, and more precisely, policies for users and network devices. It distributes policies to the network devices to enforce the policies defined by the network administrator. It provides policy decisions to control network behavior provided to the user. The policy enforcers are respectively at the lower layer to the policy management at appropriate network devices. These devices communicate with the policy management server using COPS protocol. The policy relevant information can be distributed at the appropriate hierarchy network layer in order to expedite the real time critical decisions.

Authentication server—The authentication server is the core network component. The mobility manager facilitates the authentication process for the mobile host. The authentication server is reachable through the AAA+server that provides the common protocol for Authentication, Authorization, and Accounting activities. The authentication function is provided based on the digital certificates/signatures.

Directory server—The directory server stores the user service profile and policy in a database. The directory server communicates with other network components such as policy management server using LDAP-protocol. The directory server uses Directory Enabled Networking (DEN) scheme. The DEN scheme takes an advantage of information already stored in directories.

DHCP—In an IP centric NGWN—Wireless Internet, a mobile host must be initially assigned a specific IP address that is appropriate to the network domain to which the mobile host is attached. If the mobile host moves to a new network domain, a new IP address must be assigned. The Dynamic Host Configuration Protocol provides such mechanism through which an IP address is allocated to the attached mobile host. The mobility manager component of the LSF service layer facilitates this procedure. DNS—NAI DNS—The Domain Name System is the software that allows name to number mapping. The name richweb is the 47.161.113.52 and vice versa. This is achieved through the DNS. The DNS is a hierarchy. There are small number of root domain name servers that are responsible for tracking the top-level domains and who is under them. The root domain servers between them know about all the people who have name servers that are authoritative for domains under the root. In the NGWN—Wireless Internet the DNS hierarchy is established based on the user's current location.

Mobility Manager—The mobility manager functional component is the part of the core network component. It facilitates to provide subscribers' management services during the access session establishment between the mobile host and the serving network. It also facilitates the inter-domain handoff activities.

Access Accounting server—The access accounting server is the core network component. The session server that facilitates to configure service session invocation, that also facilitates the instance for that service session at the accounting server to record the usage activities. The access accounting server is reachable through the AAA+server that provides the common protocol for Authentication, Authorization, and Accounting activities.

AAA+—The AAA+ server provides the common protocol access to the network clients to access Authentication, Authorization, and Accounting servers. Currently, the DIAMETER and RADIUS protocols are under evaluation for the AAA+ server access.

Network management—The network management functions at the different network layer hierarchy provide appropriate management functions. The management functions take care of business and service oriented concerns. Ideally these functions can be distributed to the core network for business decision (policy management) and service session related activities and at the AML for the network resources and transport session related activities. These functions include fault management, configuration management, accounting management performance management, and security management.

Call Server—The call server is the core network component. It takes the role of media gateway controller. It controls signaling gateway and media gateway components that interface with the PSTN.

Session server—Please refer to text above describing session server.

Location tracking—The location tracking is the part of the access management layer component. It keeps track of the mobile host's location movement activities in the WAG domain. It facilitates the handoff activities between cells within the WAG domain. Also, it facilitates in inter-WAG domain handoff activities. The neighboring WAG domain information can be exchanged directly. It interacts with resource manager for the purpose of maintaining radio link and Care Of Address (COA) relationship. Also it interacts with the domain database server to update the end-user's location.

Power Control function—Power control function handles all power control related activities. It performs the necessary algorithm to manipulate special situations, which may occur due to interference or adjustment during the start of a call. It interacts with resource manager for the purpose of maintaining power level of the radio link.

Connection management server—The connection management server handles activities to establish virtual packet channel through the serving network. It gets instructions from the access management server. For each service session created, a transport session manager is also instantiated. The transport session keeps track of usage activities based on the instruction provided either per packet, per byte, time in active session, or flat time. It facilitates to establish point to point or point to multi-point transport session.

Access management server—Please refer to text above for access and termination-paging function.

RF management—The RF management server is the access management layer component. It facilitates the controlling function for the radio dependent activities. It interfaces with the access management layer components. Also, it interfaces with the access interface layer components.

Appendix B: Core Network Functions

The LSF/NSF network layer consists of core functional service components required for telecommunication network. This section identifies the major core network functionality expected from the LSF/NSF network layer functional service components shown in FIG. 2. Some of the core network functions are described in the following paragraphs.

Serving domain specific address assignment.

Policy decision based on subscriber's profile, assigned network preferences, and available network resources.

Network management control function.

Subscriber management services during access session establishment that at least include authentication and authorization.

Providing subscriber's capabilities and network preferences in serving end user.

Configuring appropriate application servers or facilitating functional service components based on the subscriber's default services or invoked services.

Usage data collection and accumulation of network resources and recording.

Handoff activities to support continuous mobility between multiple access points.

What is claimed is:

1. A method for a first wireless user to communicate in a distributed Internet Protocol (IP) centric wireless network with a plurality of service layers providing a plurality of functions associated with each of the service layers, the method comprising:

accessing the network to establish a point of presence through an access interface layer at an access management layer and a core portion of the network and to designate a default amount of bandwidth and a plurality of default setup parameters, wherein the access management layer is wireless technology independent and the access interface layer is wireless technology specific;

invocating service through a session server on the network to establish an amount of network resources requested by the first wireless user; and establishing a transport session to create and manage a connection from the first wireless user to a destination address.

2. The method of claim 1 wherein the plurality of service layers includes a network service function layer.

3. The method of claim 1 wherein the plurality of service layers includes a local service function layer.

4. The method of claim 1 wherein the plurality of service layers includes an access service function layer.

5. The method of claim 4 wherein the access service function layer accommodates a plurality of technologies used for the first wireless user to communicate to the network.

6. The method of claim 1 wherein the invocating service through the session server includes providing a list of a plurality of functions available to the first wireless user.

7. The method of claim 6 wherein the plurality of functions available to the first wireless user are based on capabilities of the first wireless user and a plurality of network preferences.

8. The method of claim 7 wherein the session server also provides addressing of any appropriate server to contact for each of the plurality of functions available to the first wireless user.

9. The method of claim 6 wherein the session server contacts an accounting server through an Authorizing, Authentication and Accounting server and initiates an appropriate record of resources committed to the first wireless user.

10. The method of claim 9 wherein the accounting server sends information to an accounting accumulator at the network service layer.

11. The method of claim 9 wherein the session server instructs a connection management server to record usage information according to resources used by the first wireless user.

12. The method of claim 11 wherein the usage information includes at least one of the group consisting of: time used by first wireless user, packets used by first wireless user, flat rate for each access by first wireless user or bytes used by first wireless user.

13. The method of claim 2 wherein the network service layer includes a mobility manager that provides handoff services to the first wireless user when the first wireless user leaves the local service function layer for another local service function layer.

14. The method of claim 3 wherein the local service layer includes a mobility manager that provides handoff services to the first wireless user when the first wireless user leaves an access management layer for another access management layer.

15. The method of claim 3 wherein the access management layer includes a location tracking server that provides handoff services to the first wireless user when the first wireless user leaves a first cell in a first access interface layer for another cell in another access interface layer.

16. The method of claim 1 wherein a session server reserves any quality of service parameters and an amount of bandwidth requested by the first wireless user.

17. The method of claim 1 wherein an access and a termination functions at an access management layer reserves any quality of service parameters and an amount of bandwidth requested by the first wireless user.

18. The method of claim 1 further including sending communications from an application layer at the first wireless user wherein an user agent client resides at the first wireless user.

19. The method of claim 1 further including sending communications from a layer 3 at the first wireless user wherein an user agent client resides at an access management layer of the access layer.

20. The method of claim 1 further including an user agent server associated for each of a plurality of access interface layer of the access layer.

21. The method of claim 1 further including an user agent server that acts as a gateway by converting incoming protocols of incoming communications to a protocol understood by the first wireless user.

22. The method of claim 1 further including an user agent server that delivers incoming protocols of incoming communications to the first wireless user when the incoming protocol is understood by the first wireless user.

23. The method of claim 1 wherein the session server further provides admission control functions and address resolution to an user agent client and an user agent client proxy at a SIP protocol server.

24. The method of claim 1 wherein the session server further provides admission control functions and address resolution to a H.323 terminal and a H.323 gateway at a H.225 protocol server.

25. The method of claim 1 wherein the network includes a connection management server that can transport communications on a plurality of backbone infrastructures.

26. The method of claim 1 wherein the network includes a connection management server that can transport communications on a point to point basis.

27. The method of claim 1 wherein the network includes a connection management server that can transport communications on a point to multi-point basis.

28. The method of claim 1 further including providing the requested amount of network resources by utilizing a connection management server that utilizes a plurality of protocols to deliver a requested quality of service for latency.

29. The method of claim 1 further including providing the requested amount of network resources by utilizing a connection management server that utilizes a plurality of protocols to deliver a requested bandwidth.

30. The method of claim 1 further including deciding policy parameters at a core network level.

31. The method of claim 30 further including enforcing policy parameters at an access management level.

32. The method of claim 1 wherein a plurality of access management layer components interact with a network layer of the first wireless user to establish an access session.

33. The method of claim 1 wherein a plurality of access management layer components interact with a plurality of components to bring the mobile host on the traffic channel.

34. The method of claim 1 wherein a plurality of access management layer components interact through a connection management component to establish point to point protocol path that allows the first wireless user to access any other IP capable device through a serving network.

35. The method of claim 1 wherein a plurality of network preferred call/session control services are handled through a plurality of access management components.

36. The method of claim 1 wherein handoff, power control, and paging functions related handshakes with the first wireless user are controlled by a plurality of access management components.

37. The method of claim 1 wherein the first wireless user interacts with a plurality of protocol servers and access management service layer components.

38. The method of claim 37 wherein the plurality of protocol servers and access management service layer components interact with a plurality of components at the local service function layer.

39. The method of claim 1 wherein a plurality of components at a local service function layer provide specific services to a plurality of access management components during establishment of an access session and service session with the first wireless user.

40. The method of claim 1 wherein the accessing includes providing subscriber management and policy decision services for the first wireless user.

41. The method of claim 1 wherein policy decision services are provided for the first wireless user during user session invocation.

42. The method of claim 1 wherein Intranet services are provided to the first wireless user by a local service function layer through specialized application servers.

43. The method of claim 1 wherein the first wireless user interacts with a plurality of global network service components.

44. The method of claim 1 wherein the accessing further includes a network service function layer providing services to a local service function layer.

45. The method of claim 1 further including providing subscriber management services during an access session establishment for the first wireless user.

46. The method of claim 1 further including facilitating publicly available services.

47. The method of claim 1 further including facilitating direct home network accesses.

* * * * *